US008010801B2

(12) United States Patent  
Qi et al.

(10) Patent No.: US 8,010,801 B2  
(45) Date of Patent: Aug. 30, 2011

(54) MULTI-DATA RATE SECURITY ARCHITECTURE FOR NETWORK SECURITY

(75) Inventors: Zheng Qi, San Jose, CA (US); Meg Lin, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1061 days.

(21) Appl. No.: 11/606,492

(22) Filed: Nov. 30, 2006

(65) Prior Publication Data

US 2008/0130894 A1 Jun. 5, 2008

(51) Int. Cl.
  G06F 12/14 (2006.01)
  G06F 13/28 (2006.01)
  G06F 3/00 (2006.01)
  H04L 29/06 (2006.01)
  H04L 9/28 (2006.01)
  H04L 9/00 (2006.01)
  H04K 1/00 (2006.01)
  H04N 7/16 (2011.01)

(52) U.S. Cl. ............ 713/189; 713/153; 380/28; 380/29; 380/42; 380/255; 726/26; 710/28; 710/36; 710/38; 710/40; 710/60; 710/200

(58) Field of Classification Search .................. 713/189, 713/153; 380/28, 29, 42, 255; 726/26; 710/28, 710/36, 38, 40, 60, 200
See application file for complete search history.

(56) References Cited

U.S. PATENT DOCUMENTS

| | | |
|---|---|---|
| 7,082,530 B1 | 7/2006 | Diamant |
| 7,243,254 B1 | 7/2007 | Kuroodi et al. |
| 7,370,348 B1 | 5/2008 | Patel et al. |
| 7,886,143 B2 | 2/2011 | Qi et al. |
| 2002/0041685 A1 | 4/2002 | McLoone et al. |
| 2002/0106078 A1 | 8/2002 | Qi et al. |
| 2002/0136208 A1* | 9/2002 | Skirmont et al. ............. 370/352 |
| 2003/0115447 A1* | 6/2003 | Pham et al. .................... 713/153 |
| 2003/0133568 A1 | 7/2003 | Stein et al. |
| 2004/0139313 A1 | 7/2004 | Buer et al. |
| 2004/0143734 A1 | 7/2004 | Buer et al. |
| 2004/0193891 A1 | 9/2004 | Ollila |
| 2005/0094568 A1 | 5/2005 | Judd |
| 2005/0198531 A1 | 9/2005 | Kaniz et al. |
| 2006/0015753 A1 | 1/2006 | Drehmel et al. |
| 2006/0112431 A1 | 5/2006 | Finn et al. |

(Continued)

OTHER PUBLICATIONS

Agnew, G B., et al., "An implementation of elliptic curve cryptosystems over F2155", IEEE Journal on Selected Areas in Communications, vol. 11, No. 5, (Jun. 1993), pp. 804-813.

Bellare, M. et al., "A conventional authenticated-encryption mode", (Apr. 13, 2003),14 pages.

Bellare, M. et al., "Incremental cryptography: the case of hashing and signing", Advances in Cryptology—Proceedings of CRYPTO, Lecture Notes in Computer Science, vol. 839, (Dec. 10, 1995),19 pages.

Bellare, M. et al., "A Concrete Security Treatment of Symmetric Encryption: Analysis of the DES Modes of Operation", Proceedings of 38th Annual Symposium on Foundations of Computer Science, IEEE, (1997), 32 pages.

(Continued)

*Primary Examiner* — Aravind Moorthy  
(74) *Attorney, Agent, or Firm* — Brake Hughes Bellermann LLP

(57) ABSTRACT

An architecture and associated methods and devices are described in which a first selectable data path may be associated with a first port operating at a first data rate, a second selectable data path may be associated with a second port operating at a second data rate, and a third selectable data path may be associated with a third port operating at a third data rate that is higher than the first data rate and the second data rate. A plurality of security engines may be included which may be configurable to provide cipher key-based security for data associated with the first port and the second port using the first selectable path and the second selectable path, respectively, and configurable to provide cipher key-based security of data associated with the third port using the third selectable data path.

20 Claims, 14 Drawing Sheets

U.S. PATENT DOCUMENTS

| | | |
|---|---|---|
| 2006/0136715 A1 | 6/2006 | Han et al. |
| 2007/0055891 A1 | 3/2007 | Plotkin et al. |
| 2008/0034197 A1 | 2/2008 | Engel et al. |
| 2008/0075073 A1* | 3/2008 | Swartz ............ 370/389 |
| 2008/0130889 A1 | 6/2008 | Qi et al. |
| 2008/0141023 A1 | 6/2008 | Qi |

OTHER PUBLICATIONS

Bellare, M. et al., "The security of the cipher block chaining message authentication code", Journal of Computer and System Sciences, vol. 61, No. 3, (Jul. 29, 1999), 36 pages.

Bellare, M. et al., "XOR MACS: New Methods for Message Authentication using Finite Pseudorandom Functions", Advances in Cryptology, Proceedings of 15th Annual International Cryptology Conference, (1995), 21 pages.

Dworkin, M. "Recommendation for Block Cipher Modes of Operation: Methods and Techniques", National Institute of Standards and Technology, NIST Special Publication -800-38B, (2005), 22 pages.

Guajardo, J. et al., "Efficient Algorithms for Elliptic Curve Cryptosystems", Advances in Cryptology, (1997), pp. 342-356.

Halbutogullar, A. et al., "Mastrovito Multiplier for General Irreducible Polynomials", IEEE Transactions on Computers, vol. 49, No. 5, (May 2000), 10 pages.

Hasan, M. A., et al., "Modular construction of low complexity parallel multipliers for a class of finite fields GF(2m)", IEEE Transactions on Computers, vol. 41 No. 8, (Aug. 1992), pp. 962-971.

Housley, R. "Using AES Counter Mode With IPsec ESP <draft-ietf-ipsec-ciph-aes-ctr-00.txt>", IPsec Working Group, Internet Draft, RSA Laboratories, (Jul. 2002),12 pages.

Iwata, T. et al., "OMAC: One-Key CBC MAC", Lecture Notes in Computer Science, vol. 2887, Proceedings of Fast Software Encryption, (Mar. 10, 2003), 26 pages.

Koc, C. K., et al., "Low-Complexity Bit-parallel Canonical and Normal Basis Multipliers for a Class of Finite Fields", IEEE Transactions on Computers, vol. 47, No. 3, (Mar. 1998), 5 pages.

Kohno, T. et al., "The CWC-AES Dual-use Mode", Internet Draft, Crypto Forum Research Group, Webpage available at: http://www.zork.org/cwc/draft-irtf-cfrg-cwc-01.txt.,(May 20, 2003), 22 pages.

Krawczyk, H. "The Order of Encryption and Authentication for Protecting Communications", Lecture Notes in Computer Science; vol. 2139, Proceedings of the 21st Annual International Cryptology Conference on Advances in Cryptology, (2001), 22 pages.

McGrew, D. et al., "Flexible and Efficient Message Authentication in Hardware and Software", (2003), 20 pages.

McGrew, D. A., et al., "The Galois/Counter Mode of Operation (GCM)", (2004), 43 pages.

Orlando, G. et al., "A super-serial Galois fields multiplier for FPGAs and its application to public-key algorithms", In Seventh Annual IEEE Symposium on Field-Programmable Custom Computing Machines, (1999), pp. 232-239.

Paar, C. "A New Architecture for a Parallel Finite Field Multiplier with Low Complexity Based on Composite Fields", IEEE Transactions on Computers, vol. 45, No. 7, (Jul. 1996), 15 pages.

Paar, C. "Implementation Options for Finite Field Arithmetic for Elliptic Curve Cryptosystems", (1999), 31 pages.

Reyhani-Masoleh, A. et al., "Low Complexity Bit Parallel Architectures for Polynomial Basis Multiplication over GF (2m)", IEEE Transactions on Computers, vol. 53, No. 8, (Aug. 2004), pp. 945-959.

Rogaway, P. et al., "OCB: A block-cipher mode of operation for efficient authenticated encryption", ACM Transactions on Information and System Security, vol. 6, No. 3, (Aug. 2003), pp. 1-39.

Romanow, A. "802.1AE—Media Access Control (MAC) Security", Webpage available at: http://www.ieee802.org/1/pages/802.1ae.html, (2006).

Seroussi, G. "Table of Low-Weight Binary Irreducible Polynomials", HP Labs Tech. Report HPL-98-135, (Aug. 1998) 16 pages.

Shoup, V. "On Fast and Provably Secure Message Authentication Based on Universal Hashing", In Advances in Cryptology, (1996), pp. 313-328.

Sunar, B. et al., "Mastrovito Multiplier for All Trinomials", IEEE Transactions on Computers, vol. 48, No. 5, (May 1999), 31 pages.

Whiting, D. et al., "Counter with CBCMAC (CCM)", AES Mode of Operation, Submission to NIST, (2002), 9 pages.

Wu, H. "Bit-Parallel Finite Field Multiplier and Squarer Using Polynomial Basis", IEEE Transactions on Computers, vol. 51, No. 7, (Jul. 2002), pp. 750-758.

Wu, Y. et al., "Scan-Based BIST Fault Diagnosis", IEEE Transactions on Computer-Aided Design of Integrated Circuits and Systems, vol. 18, No. 2, (Feb. 1999), pp. 203-211.

Zhang, T. et al., "Systematic Design of Original and Modified Mastrovito Multipliers for General Irreducible Polynomials", IEEE Transactions on Computers, vol. 50, No. 7, (Jul. 2001), pp. 734-749.

"Draft Standard for Local and Metropolitan Area Networks-Port-based Network Access Control (Revision)", [8021AE] IEEE, P802.1X-2004, 175 pages.

"IEEE Standard for Local and metropolitan area networks: Media Access Control (MAC) Security", IEEE Computer Society, IEEE Std 802.1AE (Aug. 18, 2006), 154 pages.

Diffie, W. et al., "Privacy and Authentication: An Introduction to Cryptography", Proceedings of the IEEE, vol. 67, No. 3, (Mar. 1979), pp. 397-427.

"DES Modes of Operation. Federal Information Processing Standards Publication 81", (Dec. 1980).

Bartee, T C., et al., "Computation with Finite Fields", Information and Computers, vol. 6, (Mar. 1963), pp. 79-98.

Gulliver, T. A., et al., "The Generation of Primitive Polynomials in GF(q) with Independent Roots and their Applications for Power Residue Codes, VLSI Testing and Finite Field Multipliers Using Normal Basis", International Journal of Electronics, vol. 71, No. 4, (Oct. 1991), pp. 559-576.

Paar, C. "Efficient VLSI Architectures for Bit-Parallel Computation in Galois Fields", PhD thesis, Institute for Experimental Mathematics, University of Essen, Germany, (1994).

Song, L. et al., "Low-complexity modified Mastrovito multipliers over finite fields GF(2m)", Proceedings of the IEEE International Symposium on Circuits and Systems, vol. 1, (1999), pp. 508-512.

Mastrovito, E. D., "VLSI Designs for Multiplication over Finite Fields GF(2m)", Lecture Notes In Computer Science; vol. 357, Proceedings of the 6th International Conference, on Applied Algebra, Algebraic Algorithms and Error-Correcting Codes, (1988), pp. 297-309.

Office Action received for U.S. Appl. No. 11/607,747, mailed on Nov. 13, 2009.

Office Action received for U.S. Appl. No. 11/635,880, mailed on Mar. 19, 2010.

"Announcing the Advanced Encryption Standard (AES)", Federal Information Processing Standards Publication 197 (FIPS 197), (Nov. 2001), 51 pages.

"Draft IEEE Standard for Local and Metropolitan Area Networks—Port Based Network Access Control—Revision", IEEE Computer Society, IEEE Draft P802.1X-Rev/D10, (Jul. 16, 2004), 11 pages.

Notice of Allowance received for U.S. Appl. No. 11/607,747, mailed on Nov. 17, 2010, 12 pages.

Office Action Response filed for U.S. Appl. No. 11/607,747, filed Mar. 4, 2010, 14 pages.

Office Action Response filed for U.S. Appl. No. 11/607,747, filed Sep. 7, 2010, 14 pages.

Office Action Response filed for U.S. Appl. No. 11/635,880, filed Jul. 19, 2010, 11 pages.

Office Action Response filed for U.S. Appl. No. 11/635,880, filed Jan. 18, 2011, 9 pages.

Office Action received for U.S. Appl. No. 11/635,880, mailed on Mar. 10, 2011, 21 pages.

Final Office Action dated Jun. 11, 2010, for U.S. Appl. No. 11/607,747.

Advisory Action dated Sep. 15, 2010, for U.S. Appl. No. 11/607,747.

Final Office Action dated Sep. 23, 2010, for U.S. Appl. No. 11/635,880.

* cited by examiner

MULTI-DATA RATE SECURITY ARCHITECTURE FOR NETWORK SECURITY

TECHNICAL FIELD

This description relates to network security.

BACKGROUND

Computer networks, such as those that are compliant with the IEEE 802® suite of protocols, may be deployed in many different settings. For example, local area networks (LANs), including Ethernet networks, may be deployed within a corporate, campus, or home environment. Multiple LANs may be joined into one or more metropolitan area networks (MANs). Due to the wide range of deployment conditions and settings of such networks, it may be difficult or impossible to prevent unauthorized access (or attempts at access) thereto. Consequently, attempts have been made to protect the data and resources of such networks. For example, attempts have been made to maintain confidentiality of transmitted data, and to prevent unauthorized data (e.g., from unauthorized devices) from propagating on the network(s).

For example, protocols associated with the suite of IEEE 802.1® protocols have been developed to circumvent malicious attacks, theft of information, and other unauthorized network uses. For example, the IEEE 802.1AE standard, also known as MACSec, has been developed. MACSec may thus be used, for example, to identify unauthorized devices on a LAN, and/or to prevent propagation of data from such devices. MACSec uses cryptography techniques, such as exchange of cipher keys and associated encryption/decryption and authentication techniques, to provide network security at Layer 2 (the link layer) of the Open Systems Interconnection (OSI) model.

MACSec or other security techniques may be implemented within one or more microchips of a network switch or other network device. Such network devices may require operation at different data rates (e.g., 10 Mbps/100 Mbps/1 Gbps/10 Gpbs). Thus, it may be difficult for conventional devices to implement such security protocol(s) as MACSec at these data rates in a way that is production-efficient, power-efficient, or space-efficient for the related microchip(s).

SUMMARY

According to one general aspect, a first selectable data path may be associated with a first port operating at a first data rate, a second selectable data path may be associated with a second port operating at a second data rate, and a third selectable data path may be associated with a third port operating at a third data rate that is higher than the first data rate and the second data rate. A plurality of security engines may be included which may be configurable to provide cipher key-based security for data associated with the first port and the second port using the first selectable path and the second selectable path, respectively, and configurable to provide cipher key-based security of data associated with the third port using the third selectable data path.

According to another general aspect, a first security engine may be provided which may be configured to provide cipher key-based security to network data exchanged with a first port of a network switch at a first data rate. A second security engine may be provided that may be configured to provide cipher key-based security to network data exchanged with a second port of the network switch at a second data rate. A first selectable data path may be provided between the first port and the first security engine, a second selectable data path may be provided between the second port and the second security engine, and a third selectable data path may be provided between a third port of the network switch and both the first security engine and the second security engine, the third port being associated with a third data rate that is higher than both the first data rate and the second data rate.

According to another general aspect, a network device may include a plurality of ports associated with a first data rate, an additional port associated with a second data rate that is higher than the first data rate, at least two security engines configured to provide cipher key-based security for frames of data processed by the network device, and control logic configured to associate the at least two security engines with either the additional port or at least a subset of the plurality of ports.

The details of one or more implementations are set forth in the accompanying drawings and the description below. Other features will be apparent from the description and drawings, and from the claims.

DETAILED DESCRIPTION

Figure 1:
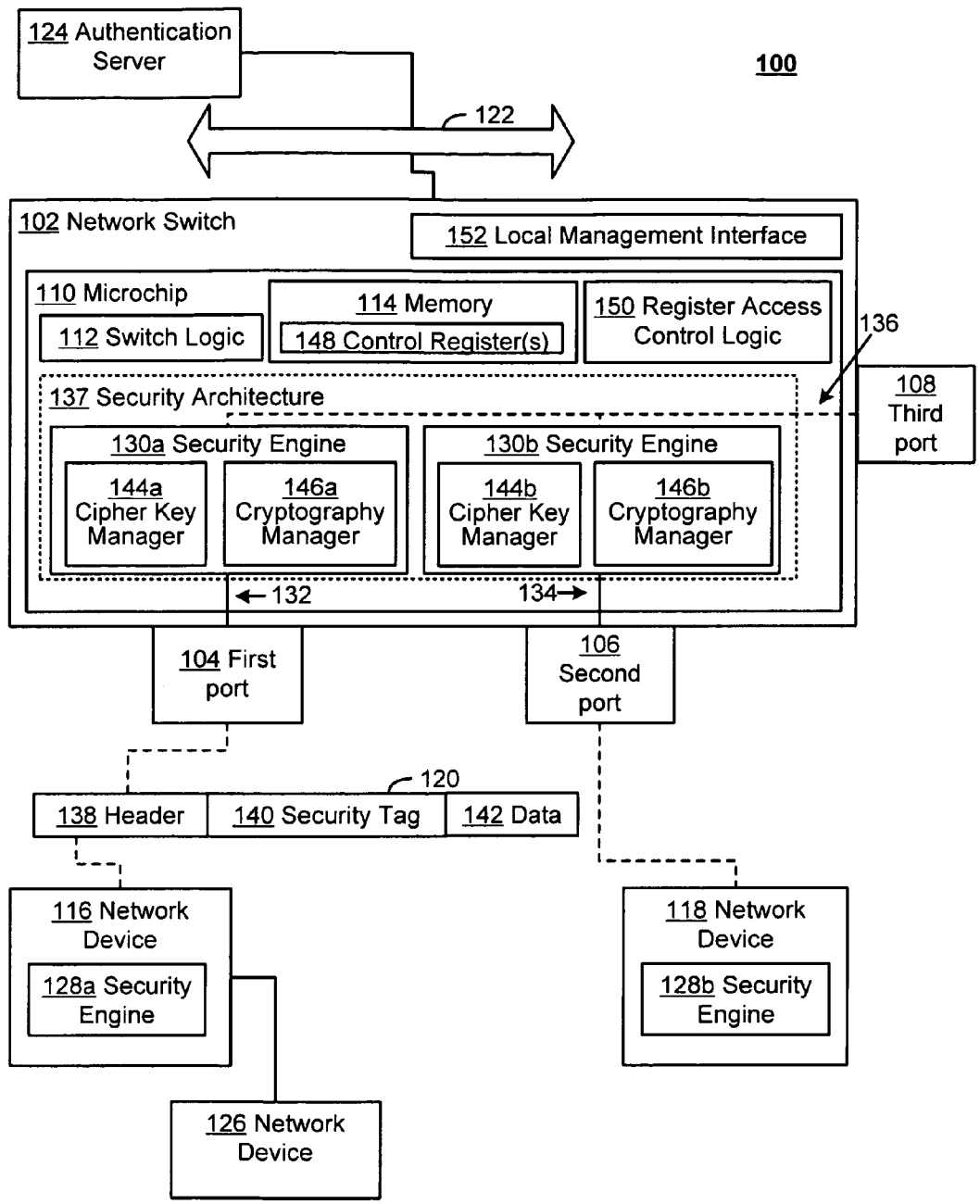
FIG. 1 is a block diagram of a network implementing a multi-data rate architecture for network security including a network switch.

FIG. 1 is a block diagram of a network 100 implementing a multi-data rate architecture for network security including a network switch 102. In the example of FIG. 1, the network switch 102 provides switching for the network 100 at a plurality of possible or available data rates. The network switch 102 is configured to include an architecture that provides network security for data received/transmitted at each of these pluralities of data rates, in a manner that is flexible, space-efficient, production-efficient, and cost-efficient, and that provides a high level of performance, as well. For example, as described in more detail below, the network switch 102 may be configured to overlay selectable data paths on a common security architecture, in a manner that allows a designer to configure the network switch 102 to provide network security for various numbers and combinations of available data rates.

In FIG. 1, the network 100 may include, for example, a local area network (LAN) or metropolitan area network (MAN), as referenced above, and may implement the Ethernet protocol to provide network access to many different users, each of whom may have varying levels of permission or access to view or manipulate network data. The network 100 may be implemented, for example, for a corporation or other business at one or more physical locations thereof. The network 100 also may represent a network providing service to a plurality of consumers at their respective houses or other locations. Of course, these are but a few, non-limiting examples of types of networks represented by the network 100, and many other examples of networks that are interoperable with, or make use of, the network switch 102, may be used, as well.

The network switch 102 includes a first port 104, a second port 106, and a third port 108, where each of the first port 104, the second port 106, and the third port 106 may operate at different data rates. For example, the first port 104 and the second port 106 may operate at a first data rate, so that data received at the first port 104 may be switched by the network switch and transmitted using the second port 106. Meanwhile, the third port 108 may be operated at a substantially higher data rate, and may be used to communicate or coordinate with other network switch(es) (not shown in FIG. 1) of the network 100.

Of course, the inclusion of the ports 104, 106, 108 is intended merely to illustrate, with clarity and brevity, certain aspects of the structure and function of the network switch 102. In practice, the network switch 102 may include many more ports than the three illustrated in FIG. 1. In fact, all other factors being equal, it may be advantageous to include as many ports as may be allowed by the hardware and software capabilities of the network switch 102, since such a structure allows for maximal ability, utility, and flexibility of the network switch 102 in a variety of network settings.

In constructing such high-port count switches, it may be advantageous to construct the supporting switching hardware in a modular, reproducible, configurable manner. For example, the network switch 102 may have 12 ports at a first data rate (e.g., 10 Mbps, 100 Mbps, or 1 Gbps), plus an additional port at a higher data rate (e.g., 10 Gbps). Each of these 12+1 ports may be constructed in a similar manner, but may be configured for its appropriate data rate before (or after) being deployed in the network switch 102. If other elements of the network switch 102 are capable and compatible, the port count of the network switch 102 may be expanded accordingly, e.g., by duplicating the entire port structure to obtain a 24+2 or, further, a 48+4 structure. Of course, these port counts, structures, and speeds are merely examples, and other examples may be used.

The network switch 102 of FIG. 1 also includes a microchip 110 that is configured to support and enable the operations of the network switch 102. The microchip 110, for example, provides a designer, manufacturer, or producer of the network switch 102 with the ability to configure the network switch 102 to provide network security for a desired number, combination, and/or configuration of available ports and data rates, as described in more detail, below.

In FIG. 1, the microchip 110 includes switch logic 112 and memory 114. The switch logic 112 is configured, for example, to direct network data traffic between ports of the network switch 102. For example, the switch logic 112 may receive data from the first port 104 and determine that the data should be forwarded to a designated recipient using the second port 106. In so doing, the switch logic 112 may consult the memory 114. The memory 114 may provide many other types of, and uses for, any data stored therein. More generally, many structural and functional elements of the switch logic 112 and the memory 114 are either described in more detail below, or would be well-known to an artisan of ordinary skill.

It should be noted, however, that the memory 114 may include, for example, various known types of registers, read only memory (ROM), random access memory (RAM), flash memory, or virtually any appropriate memory type, or combinations thereof. The memory 114 is illustrated on the microchip 110 in FIG. 1, but it should be apparent that some or all of the memory 114 may be available on the network switch 102 and off of the microchip 110 (e.g., in a separate chip, not shown). There are various, known trade-offs related to where and how to construct the memory 114, since, for example, putting the memory 114 on the microchip 110 provides for faster and easier access, but also consumes valuable space on the microchip 110 that may be used for other purposes. Consequently, various known compromises exist and may be implemented, such as, for example, an on-chip cache memory complemented by an off-chip memory. Further, the memory 114 may include firmware, which generally represents stored code or settings that may be defined and stored during an initial configuration, design, or set-up for the microchip 110, and that then may be automatically implemented thereafter.

Thus, it will be appreciated that the network switch 102 may receive data from a network device 116, e.g., by way of the first port 104, and may switch or direct the data, using the switch logic 112 and the second port 106, to a network device 118. More specifically, the network device 116 may send a frame 120 of data, described in more detail below, that the network switch may receive, analyze, manipulate, and forward in a desired manner. Of course, many types of network devices 116, 118 may be used, and various formats and protocols for the frame 120 may be used, as would be apparent, and/or as discussed in detail, below. For example, the network devices 116, 118 may include one or more of a personal computer, a laptop computer, a network-enabled personal digital assistant (PDA) or other personal device, a voice-over-internet-protocol (VOIP) telephone, a server, or virtually any other network-capable device. The frame 120 may be formatted and processed, as referenced above, in accordance with known IEEE® 802 standards, or variations thereof.

Depending on a deployment setting and other factors associated with the network 100, the network 100 may be susceptible to various security threats. Some such security threats are well-known, and not discussed here in detail, while other, new and unknown security threats are also constantly being developed. For example, where the network 100 represents a wired LAN, security threats may include passive wiretapping, masquerading, denial-of-service, or other attempts to obtain network data without permission or to disrupt network access or operations.

Consequently, the network 100 may implement various types of authentication protocols that attempt to establish an identity and/or permission-level of a user, e.g., when the user signs on to the network 100. For example, the network 100 may utilize a shared media 122. For example, the network 100 may represent an Ethernet passive optical network (EPON), in which case the shared media 122 may include a fiber optic cable. Many other examples of the shared media 122 may be used that provide network access as described herein, including, for example, standard Ethernet cables/wiring.

As shown in FIG. 1, the shared media 122 may provide a connection to an authentication server 124. When the network device 116 wishes to join the network 100, such as when a new user connects a local computer, the authentication server 124 may be used to authenticate that user, so as to ensure that only recognized users are granted access. For example, the IEEE® 802.1X standard may be used, in which the network switch 102 initially passes only authentication frames (or authentication-related frame portions) to the authentication server 124. Then, the authentication server 124 may compare the authentication frames to stored user-access information, and grant access accordingly. If access is granted, then the connecting device, e.g., the network device 116, may be granted access to the network 100.

Such authentication may provide suitable network security in some situations; however, using only this technique(s) may leave the network 100 vulnerable in other situations. For example, the network device 116 may include a VOIP phone that plugs into the network 100 and is authenticated. Then, a network device 126 may plug into the network device 116 and thereby obtain access to the network 100, without having been authenticated itself. Consequently, the network device 126 may cause damage to, or perform theft of, network operations.

In order to provide additional network security, and as referenced above, the IEEE® 802.1AE protocol has been developed, also known as MACSec. MACSec may be used to provide on-going encryption and authentication of network traffic, beyond the initial authentication just discussed. For example, MACSec may be used to provide symmetric cipher key-based security between, for example, the network devices, 116, 118 and the network switch 102. It will be appreciated that a general operation of MACSec is well-known, and that MACSec includes many features and functions that may not be discussed explicitly herein. Moreover, MACSec, and the variations discussed herein, merely provide examples of the type of security protocol(s) which may be used by various example implementations described herein, and other examples also may be used.

In the example of FIG. 1, the network devices 116, 118 include security engines 128*a*, 128*b*, respectively, which may represent MACSec-compliant security engines. The network switch 102 includes one or more corresponding security engines 130*a*, 130*b*, as shown. Consequently, the network 100 may be provided with symmetric key (e.g., both sides of the transaction have access to necessary, private cipher keys), point-to-point network security.

More specifically, for example, the network device 116 may wish to send data to the network device 118, and may formulate the data into the frame 120. The security engine 128*a* may encrypt the frame 120 and forward the frame 120 to the network switch 102 where the frame 120 is received at the first port 106. The security engine 130*a* may receive and decrypt the frame 120, and then forward the decrypted frame 120 to the switch logic 112, which may determine that the desired recipient is the network device 118. The switch logic 112 may then forward data from the frame 120 to the security engine 130*b*, which may provide (re)encryption and forwarding, via the second port 106, to the network device 118. Finally, then, the network device 118 may use the security engine 128*b* to decrypt the received frame for the desired data access.

The above process, more detailed examples of which are provided below, relies on a Security Association (SA) between the various pairs of security engines 128, 130, in which cipher keys (e.g., security association keys, or SAKs) are pre-determined and agreed to by the engines in question. Consequently, it should be apparent that the network device 126 in the example of FIG. 1, which is not equipped with an appropriately-configured security engine of its own, will generally not be able to obtain full access to the network 100 and/or the network switch 102 (even if authenticated by the authentication server 124). Rather, frames originating from the network device 126 may be blocked and/or processed in some other manner, e.g., dropped, cataloged, or investigated.

In FIG. 1, the plurality of security engines 130*a*, 130*b* may be configured to leverage a common architecture (or common architectural elements) to support the plurality of data rates that may be implemented by the network switch 102. For example, a first selectable data path 132 is illustrated that provides a link or channel between the first port 104 and the first security engine 130*a*, while a second selectable data path 134 is illustrated that provides a link or channel between the second port 106 and the second security engine 130*b*. Of course, the data paths 132, 134 are merely intended as representative of a plurality of data paths that may be used to provide line-speed processing of the frame 120 by the security engines 130*a*, 130*b*, and, in this regard, more detailed examples of the data paths 132 and 134 are provided in more detail, below.

Meanwhile, a third selectable data path 136 is illustrated that provides a link or channel used by the third port 108, and that operates at the (higher) line speed of the third port 108 by leveraging the resources of both of the security engines 130*a*, 130*b*. Again, it will be apparent that the third selectable data path 136 represents a plurality of data paths that may be used to leverage the resources of the security engines 130*a*, 130*b* in the manner(s) described herein.

In the example of FIG. 1, the first and second selectable data paths have been provided and selected for processing of the frame 120 at line speed of the ports 104, 106. In order to support the third port 108, the third selectable data path 136 may be selected for use, and the security engines 130*a*, 130*b* may be configured accordingly. In other implementations, additional security engines, not shown in FIG. 1, may be provided, and the third selectable data path may be selected and configured to use these security engines to support the third port 108.

Thus, it will be appreciated that the microchip 110 may be constructed in a modular manner, in which a security architecture 137 of the plurality of security engines 130*a*, 130*b* (in this example, the plurality includes the two illustrated security engines 130*a*, 130*b*, but may include more, as described below) may be replicated and included for as many times as needed to support a desired number of ports of the network switch 102. Then, each security architecture 137 of such security engines may be configured (and later re-configured) as desired to support a desired number, configuration, and combination of ports and data rates.

For example, the security architecture 137 of a plurality of common security engines may include 12 substantially identical security engines (e.g., security engines 130*c*-130*l*, not shown in FIG. 1), where each of the 12 security engines may be associated with, and configured to process, data from an associated 1 Gbps port of the network switch 102. That is, the first and second data paths 132, 134 (and 10 other data paths) may be connected to each of the 12 security engines. Meanwhile, the same or similar security architecture 137 including 12 security engines may again be produced on the microchip 110, but, for this instance, the 12 security engines (or some appropriate subset) may be configured to process data from the third port 108, at a higher data rate of, e.g., 10 Gbps. That is, what is referred to as the third selectable data path 136 of FIG. 1 may be selected, connected, and/or configured to allow this second security architecture 137 of, in this example, 12 security engines, to execute at a substantially higher data rate.

Many examples of how the third selectable data path 136 may be configured to leverage the common security architecture(s) 137 of a plurality of security engines are described in detail, below. For example, the security engines (including, e.g., the security engines 130a, 130b), or subsets or portions thereof, may be connected in parallel, and/or may be pipelined.

Thus, in a high port count switch processing a number of different data rates, the (in these examples) 12 security engine architectures may be deployed and configured in these and many other implementations. For example, one instance of the security architecture 137 having 12 security engines may be configured for 12 1 Gbps ports, and the same or another instance may be configured for 4 2.5 Gbps ports, and the same or another instance might be configured for a single 10 Gbps port. Of course, a number, construction, and configuration of security engines included in each instance may vary, depending on the relative or absolute data rates in question, or on other factors.

Each security engine 130a, 130b may include different components or subcomponents that are designed for different, complementary roles. These roles may vary depending, for example, on a structure and/or format of the frame 120, or on other factors. The frame 120 is illustrated generically in FIG. 1 as including a header 138 (which may include, for example, source/destination address information), security tag 140, and (encrypted) data 142.

A more specific example of a MACSec compliant frame is illustrated and discussed below with respect to FIG. 4. However, the frame 120 of FIG. 1 illustrates the point that the security engines 130a, 130b include components or subcomponents designed for specific roles. For example, the security engines 130a and 130b are illustrated as including a cipher key manager 144a and 144b, respectively, as well as an cryptography manager 146a, 146b, also respectively.

In general, the cipher key manager 144a may be responsible for detecting the security tag 140 and determining a matched key for the security tag 140 that allows for authentication and possibly decryption of the (encrypted) data 142. Meanwhile, the actual authentication and possibly decryption of the data 142 may be performed by the cryptography manager 146a, using the matching key(s). In the example of MACSec, the cipher suite known as advanced encryption standard (AES) in Galois counter mode (GCM) may be used to provide block-based (e.g., for 128 bit blocks of data) encryption/decryption to perform integrity-only or integrity/confidentiality protection, and thus may be referred to as the AES-GCM 128 cipher suite, which is explained in more detail, below.

By splitting the structures and functions of the security engines 130a, 130b in this manner, the selectable data paths 132, 134, 136 may be constructed in a desired manner for the different components or roles. For example, the third selectable data path 136 may connect the cipher key managers 144a, 144b in parallel, and may connect a first portion of the cryptography managers 146a, 146b in a pipelined or serial fashion, while connecting a second portion of the cryptography managers 146a, 146b in parallel.

Desired settings for defining or selecting between the first selectable data path 132, the second selectable data path 134, and the third selectable data path 136, may be stored in the memory 114, as would be appropriate, such as, for example, in firmware and/or using control register(s) 148 to define the desired ones of the data paths 132, 134, 136 for each of the security architecture(s) 137 and/or security engines 130a, 130b. For example, register access control logic 150 may be used to configure registers, tables, multiplexers, or other elements of the security architecture 137, e.g., the control register(s) 148. Examples of the register access control logic 150 are provided in more detail below, e.g., with respect to FIG. 3. A suitable local management interface (LMI) 152 may be used to communicate with the register access control logic 150 to, among other functions, configure the selectable data paths 132, 134, 136. For example, an administrator of the network switch 102 may use the local management interface 152 to issue a command to alter the security architecture 137 from using the first, second selectable data paths 132, 134 to using the third selectable data path 136. In this case, for example, the local management interface 152 and/or the register access control logic 150 may determine, among other requirements, that a particular multiplexer or other element should be reconfigured (e.g., to accept a different input corresponding to the third selectable data path 136). In this case, the register access control logic 150 may first determine which of the control register(s) 148 is relevant to this operation, and may then adjust the determined control register appropriately.

In some example implementations, the components of the security engines may be shared or may overlap within the security architecture 137, such as when two or more security engines share the same cipher key manager (e.g., the cipher key manager 144a). In other words, for example, if the finding of the correct, matching cipher key by the cipher key manager 144a may be performed faster than the corresponding encryption of data, then fewer cipher key managers may be needed than cryptography managers within the security architecture 137 (e.g., in the example of 12 security engines referenced herein, there may be 4 cipher key managers, each processing data from a cluster of three ports, while 12 cryptography managers each process data from 1 of the 12 corresponding ports, as shown and described with respect to FIG. 7).

These and other examples will be apparent from the below description. In general, however, it will be appreciated that the security engines 130a, 130b and the corresponding security architecture 137 illustrate that the same or similar hardware may be constructed and replicated on the microchip 110 as many times as needed for given port count of the network switch 102. Then, for one such security architecture, the first selectable data path 132 and the second selectable data path 134 may be selected, and for the same or another security architecture, the third selectable data path 136 may (later) be selected. For yet another security architecture, a fourth (or fifth, or higher) selectable data path(s) (not shown in FIG. 1) may be selected, corresponding to yet another data rate. Consequently, construction of the microchip 110 may proceed quickly, efficiently, and reliably, and an area of the microchip devoted to port-based network security may be predictable and relatively reduced. Moreover, these multi-data rate security architecture(s) may be implemented to provide many different types and configurations (e.g., many different port counts and data rates) for different network switches.

Figure 2:
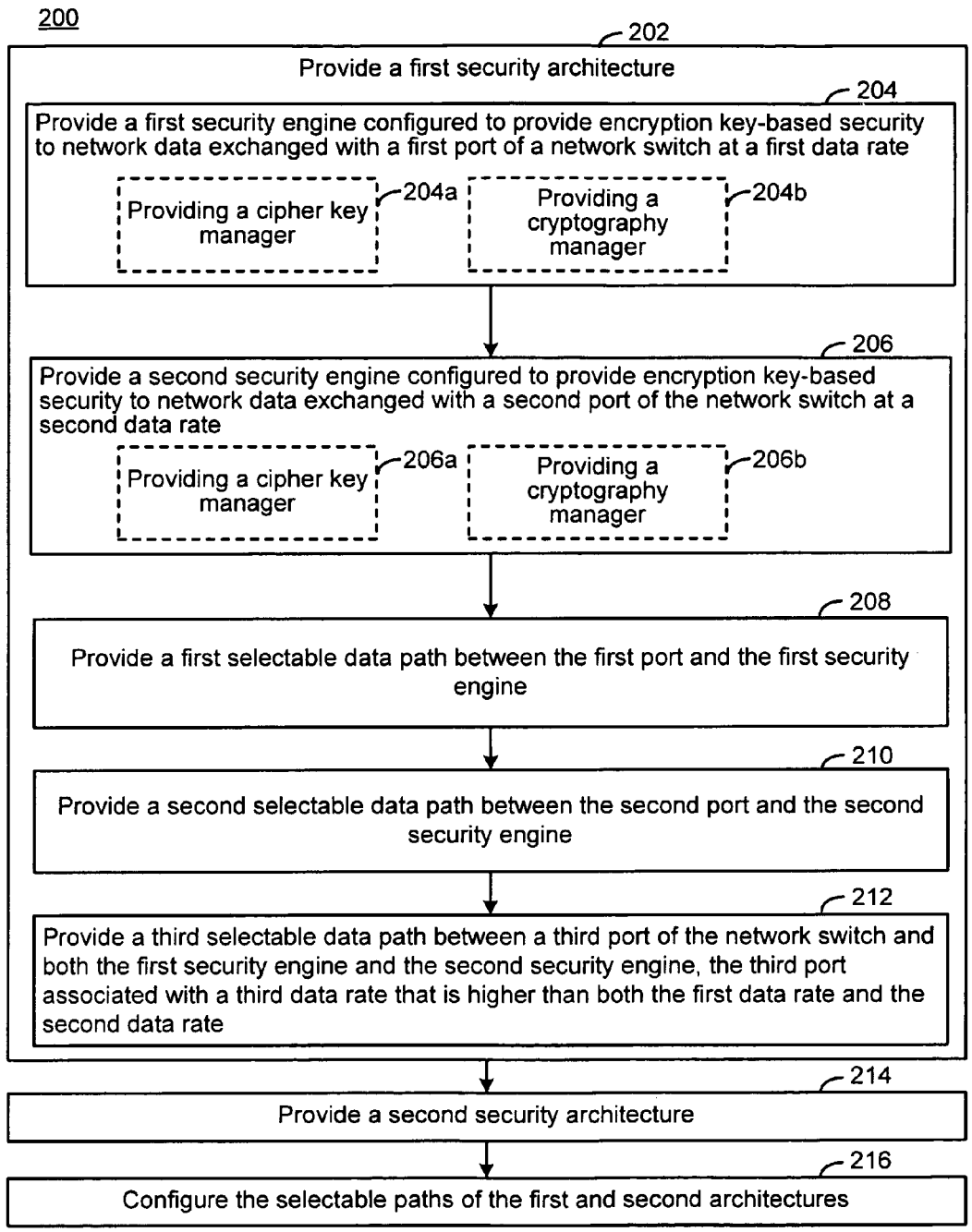
FIG. 2 is a flowchart illustrating techniques for providing and implementing the network switch of FIG. 1.

FIG. 2 is a flowchart 200 illustrating techniques for providing and implementing the network switch 102 of FIG. 1 with the security architecture(s) 137. In FIG. 2, a first security architecture is provided (202). For example, a manufacturer or designer of the microchip 110 may design and/or fabricate an instance of the security architecture 137.

As shown, providing the first security architecture may include additional example operations. For example, a first security engine may be provided that is configured to provide cipher key-based security to network data exchanged with a first port of a network switch at a first data rate (204). For example, the designer or manufacturer of the microchip 110 may provide the first security engine 130a, which may include a MACSec or MACSec-compatible security engine, and which may be configured to process data from the first port 104 (e.g., at 1 Gbps). As discussed above with respect to FIG. 1, this providing operation(s) may include providing a cipher key manager (e.g., the cipher key manager 144a) (204a) and/or providing an cryptography manager (e.g., the cryptography manager 146a) (204b).

Similarly, a second security engine may be provided that is configured to provide cipher key-based security to network data exchanged with a second port of the network switch at a second data rate (206). For example, as described above, the designer or manufacturer of the microchip 110 may provide the second security engine 130b, which may include a MACSec or MACSec-compatible security engine, and which may be configured to process data from the second port 106 (e.g., again, at 1 Gbps). Again, the providing of the security engine 130b may include providing a cipher key manager (e.g., the cipher key manager 144b) (206a) and/or providing an cryptography manager (e.g., the cryptography manager 146b) (206b).

A first selectable data path may be provided between the first port and the first security engine (208), e.g., the first selectable path 132 between the first port 104 and the security engine 130a. A second selectable data path may be provided between the second port and the second security engine (210), e.g., the second selectable data path 134 between the second port 106 and the security engine 130b. For example, the designer or manufacturer may define connections or other data paths that may be selected or defined by appropriate settings of the control register(s) 148.

A third selectable data path may be provided between a third port of the network switch and both the first security engine and the second security engine, the third port associated with a third data rate that is higher than both the first data rate and the second data rate (212). For example, the third selectable path 136 may be provided between the third port 108 and the security engines 130a, 130b, where the third data rate may be, e.g., 10 Gbps. Again, the third selectable data path 136 may be defined and/or selected, for example, by appropriate settings of the control register(s) 148.

Then, a second security architecture may be provided (214), e.g., a second instance of the security architecture 137. As the operations for providing the second security architecture may be substantially similar to those for providing the first security architecture (202), the operations are not repeated here in detail.

The various selectable paths of the first and second architectures may then actually be selected and configured in a desired manner (216). For example, in the security architecture 137, the different selectable options include either the first and second data paths 132, 134 (e.g., at 1 Gbps), or the third selectable data path 136 (e.g., for the third port 108 at 10 Gbps), and a designer, producer, manufacturer, or user/administrator of the network switch may decide whether the specific instance of the security architecture 137 will be used at 1 Gbps or 10 Gbps, and select and configure the selectable data paths 132, 134, 136 accordingly.

In general, then, FIGS. 1 and 2 illustrate that a designer, producer, or manufacturer of the microchip 110 and/or the network switch 102 may provide a plurality of security architecture(s) 137. For example, the hardware for the security architecture(s) 137 may be fabricated on the microchip 110, for a number of the security architecture(s) 137 that will be necessary to support a given number of ports of the network switch 102. The various security architecture(s) 137 may or may not be identical. For example, a first security architecture 137 may have 12 security engines (e.g., 130a, 130b . . . ), each with its own cipher key manager (e.g., 144a) and cryptography manager (e.g., 146a). Meanwhile, a second security architecture 137 may have 12 security engines (e.g., 130a, 130b . . . ), with only 4 cipher key managers (e.g., 144a) shared therebetween and 12 individual cryptography managers (e.g., 146a).

Each of the security architecture(s) 137 may then be configured to operate at a desired data rate, by selecting from among the available selectable data paths. That is, the security architecture(s) 137 may be configured such that individual security engines (130a) operate individually, or may be configured such that individual security engines are combined to operate together at a relatively higher data rate.

FIG. 2 is illustrated as a sequential order of individual operations; however, it will be appreciated that this is merely for clarity and simplicity of explanation, and that the operations of FIG. 2 may occur any number of times, and in any appropriate order or sequence, and may be supplemented as necessary with desired details not illustrated in FIG. 2. For example, during design and fabrication of the microchip 110, the multiple security architectures 137 may be fabricated together, e.g., in parallel.

As should be appreciated from FIGS. 1 and 2, a designer of the microchip 110 may provide the microchip 110 in a consistent, straight-forward manner, while minimizing an area used of (and a power consumed by) the microchip 110, simply by producing the plurality of security architectures 137. Then, for example, a producer, manufacturer, or customer of the microchip 110 (e.g., a manufacturer or administrator of the network switch 102) may select (or may request the microchip designer to select) from among the selectable data paths so as to configure the microchip 110 for the particular port count and other features of the network switch 102. Consequently, the security architecture(s) 137 are self-contained, and may be integrated into a variety of types or designs of the microchip 110 in a modular, straight-forward manner.

Figure 3:
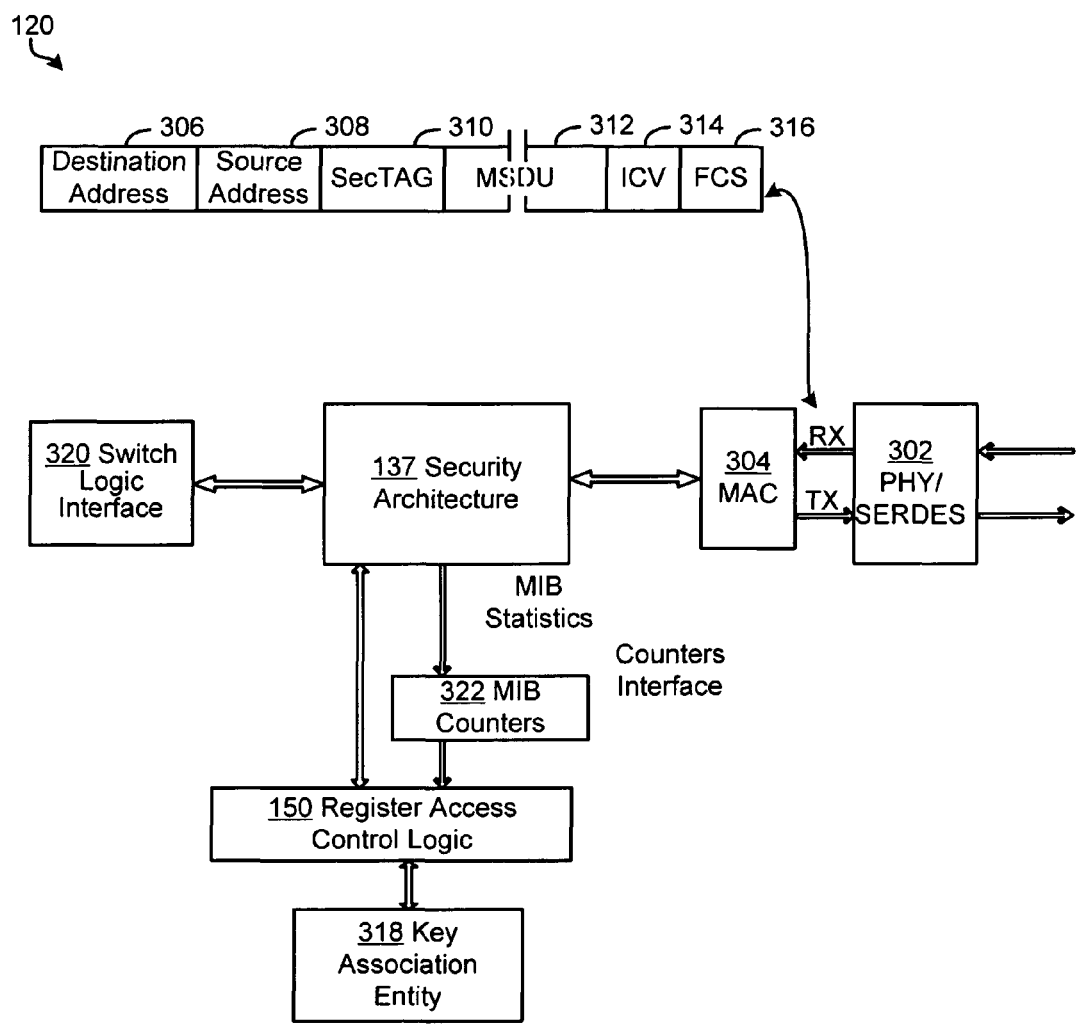
FIG. 3 is a block diagram of a security architecture of FIG. 1 in a network switch environment.

FIG. 3 is a block diagram of the security architecture 137 of FIG. 1 in a network switch environment 300, such as may occur in the network switch 102 of FIG. 1. In FIG. 3 and in most of the examples to follow, the security architecture 137 is discussed in the example context of the IEEE® MACSec standard(s), such as 802.1AE. However, as explained above, such contexts are merely for the sake of example, and other contexts and settings requiring the security architecture 137, or similar architectures, also may be used. Aspects of the MACSec standard(s) are described herein for clarity and convenience in understanding the provided examples, but, of course, it will be appreciated that many other details are omitted for the sake of brevity, but would be apparent to one of ordinary skill in the art.

In general, the IEEE MACsec standard(s) define port-based link layer security services and protocols to be used, for example, to protect Ethernet-based networks. MACsec is capable of providing security on/for connectionless data integrity, data origin authenticity, confidentiality, and discussed in more detail below, replay protection.

In FIG. 3, then, PHY/SERDES 302 represents a physical interface at which a physical media is terminated and at which a SERializer/DESerializer (SERDES) is used to convert data received from the physical media, e.g., by way of the first port 104, between a serial data stream and a parallel data stream (depending on a direction of the data as being received/transmitted). The interface may be media dependent (e.g., may be different for a conventional wired LAN as opposed to an EPON).

Media access control (MAC) 304 represents the hardware and/or logic implemented at what is known as the data link layer of the OSI model, which sits above the physical layer and which relies on MAC addresses associated with the various network devices. The Ethernet protocol (and the network switch 102 itself) operates at this layer, as do other known protocols, such as, for example, the advanced data communications control procedure (ADCCP). In some settings, the data link layer may be considered to include a specific MAC layer as being separate from what is known as the IEEE 802.2 logical link control (LLC) layer. In FIG. 3, the MAC 304 may be responsible for, for example, standard Ethernet frame processing at relevant data rates (e.g., 10 Mbps, 100 Mbps, 1 Gbps, or 10 Gbps), such as recognizing where frames begin/end within a data stream, padding undersized frames, truncating oversized frames, or performing other well-known functionalities.

Thus, the MAC 304 is illustrated as processing the frame 120, which in the example of FIG. 3 is illustrated as being MACSec-compliant. As such, the frame 120 includes a destination address 306 and a source address 308 for destination and source network devices, respectively. A SecTAG 310 is included that represents a security tag used by MACSec as part of available encryption/authentication procedures, and is analogous to the security tag 140 of FIG. 1 and is discussed in more detail below. MAC Service Data Unit (MSDU) 312 represents the user data or payload. An integrity check value (ICV) 314 represents a value that is checked by the security architecture 137 to verify integrity of the frame 120 (e.g., as described herein, the security architecture may use a cipher key associated with the SecTAG 308 to determine a desired ICV, and may then compare the desired ICV with the actual ICV 314, so that a match indicates integrity of the frame 120. In general, then, the ICV may represent any value or tag that may be used for authentication in the manner(s) described herein). Finally in the example frame 120 of FIG. 3, a frame check sequence (FCS) 316 refers to a checksum character(s) used for error detection and correction, e.g., using a cyclic redundancy check (a known type of hash function used to produce the checksum).

Of course, other elements of the frame 120 may be included, e.g., additional preamble and/or header information, as well as bytes added in front of the SecTAG 310. Generally for the examples included herein, though, it will be appreciated that at least the SecTAG 310 and the ICV 314 are added to, or removed from, the frame 120, as part of the MACSec protocol(s). The MSDU 312 also may be additionally encrypted to provide confidentiality of the MSDU. Further, additional tags and headers such as virtual LAN (VLAN) tags and logical link control (LLC) headers may be part of the secured data after the SecTAG 310, as well.

As described in more detail below, the SecTAG 310 may be used to determine, e.g., from the memory 114, an associated security association (SA), or, more specifically, a SA identifier. For example, the network switch 102 may form a first SA with the network device 116, and a second SA with the network device 118. Each of the SAs is associated with a cipher key(s) for each device, and possibly other security-related information. Therefore, for example, when the frame 120, or other frame, is received at the network switch 120, the appropriate SA for the received frame may be determined (e.g., may be looked-up in the memory 114), so that the other relevant information (e.g., cipher key(s)) also may be determined and used.

For example, in FIG. 3, a key agreement entity (KaY) 318 is illustrated that may be accessed using a local management interface (LMI) to the register access control logic 150. The 802.1af standard is designed to define the key agreement protocol as the KaY entity 318 to support the establishment of a one-way (i.e., each way) secure channel (SC) and SA for the security architecture 137.

In general, appropriate interfaces may be included, such as switch logic interface 320 and associated logic that allows the security architecture 137 to communicate with the switch logic 112 (not shown in FIG. 3), or a desired interface between the MAC 304 and the security architecture 137 that may be used to make the data flow between the MAC 304 and the security architecture 137 seamless and cost-effective.

Further, a management information base (MIB) 322 may be included that may be used, for example, to track, and thereby manage, activity of the security architecture 137. The MIB 322 may be compliant with the 802.1AE and or 802.1AF standards. Counters of the MIB 322 may, for example, track a number of dropped frames, or a number of suspicious frames or other information that may indicate a malicious attack, or may otherwise track an efficacy of the security architecture 137 and/or other elements of the environment 300. Again, appropriate (e.g., standards-compliant) interfaces may be used to manage or otherwise implement the MIB 322. Further, an instance of the MIB 322 may be shared between multiple instances of the security architecture 137.

The MAC 304 is also illustrated as implementing the register access control logic 150, which may be used, for example, to set registers within the security architecture 137 so as to form desired ones of the paths 132, 134, 136 for the instances of the security engines 130a, 130b, or other security engines. The register access control logic 150 also may be used to manage interfaces between, as shown, the security architecture 137 and the Key Agreement Entity 318, or other local management interfaces (LMIs).

In summary, then, it should be understood that MACsec operates on the principle of providing security for a port of the network switch 102. Network configuration and MACsec key agreement may be carried out before the main traffic flow is enabled on the port. The MACsec protocol may operate, for example and as referenced above, in both point-to-point LAN and shared-media LAN environments. The security architecture 137 (which may be referred to as one or more "SecY entity" or "SecY entities" in MACSec terminology) may be associated with one or more ports, each of which may be associated with a single connectivity association (CA) at a given time. The security architecture 137 establishes multiple, unidirectional, secure channels (SC) with its peers in the same CA.

When transmitting, MACsec provides security service to requests made at the port using the SA pointed to by the SA identifier (based on SecTAG 310 and/or related information from the frame 120). In doing so, MACsec inserts the SecTAG 310 into the frame, performs integrity computation, and inserts the ICV 314 into the frame 120. MACsec optionally encrypts the MSDU 312. The FCS 316 may be updated after the frame 120 as a whole has been protected.

When receiving a frame, MACsec performs SA look-up based on the SA identifier (assuming that the frame is protected by MACsec). The frame may then be decrypted and authenticated. Non-authenticated frames may be discarded, and authenticated frames may optionally be checked for replay attacks (e.g., performed by attackers re-sending authenticated information in the hopes of gaining or disrupting network access therewith). Replayed frames may be discarded, and the replay window may be updated. The management information for the receive operation also may be updated in the MIB 322.

Thus, in a point-to-point LAN, two stations (e.g., the network device 116 and the network switch 102) may connect directly to each other, and each station has at most one transmit SC and one receive SC, while a Connectivity Association (CA) has at most one security architecture 137 peer. In a shared media LAN, each station may have only a single transmit SC, used to transmit to all other stations, but may have multiple receive SCs and security architecture 137 peers (for receiving traffic from stations belonging to the same CA). MACSec operation(s) in other network environments are known, as would be apparent.

Figure 4:
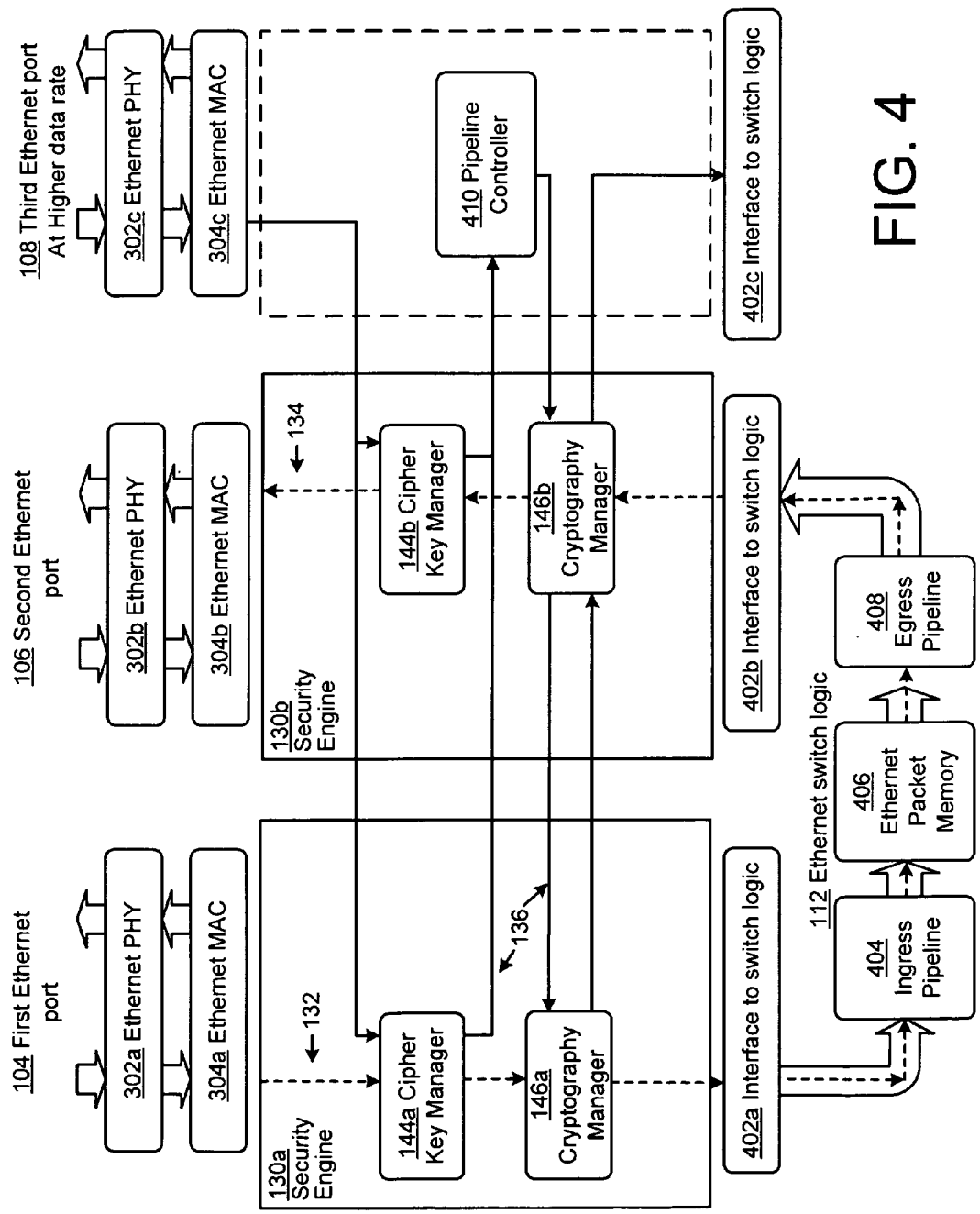
FIG. 4 is a block diagram illustrating an operation of the network switch of FIG. 1, in the network switch environment of FIG. 3.

FIG. 4 is a block diagram illustrating an operation of the network switch 102 of FIG. 1, in the network switch environment 300 of FIG. 3. More specifically, FIG. 4 illustrates possible data flows through the network switch 102 and environment 300, using either the first and second selectable data paths 132, 134, or the third selectable data path 136.

In the example of FIG. 4, data is received at the first port 104 at a first data rate (e.g., 100 Mbps or 1 Gbps), and is transmitted through Ethernet PHY 302a and Ethernet MAC 304a to the first security engine 130a. The cipher key manager 144a uses the SecTAG 310 to determine the associated security association key(s) (SAK), which may then be used by the cryptography manager 146a to perform authentication and possibly decryption of user data within the received frame(s). Thus, it will be appreciated, and is illustrated in more detail below, that the cipher key manager 144a generally only determines and/or processes the relevant key(s), while the data itself (e.g., the MSDU 312 of the frame 120) may be passed directly to the cryptography manager 146a for authentication/decryption (e.g., may bypass the cipher key manager 144a as part of the first selectable path 132).

The authenticated and decrypted data may then be passed through an interface 402a to the switch logic 112, illustrated in FIG. 4 as including an ingress pipeline 404, Ethernet packet memory 406, and egress pipeline 408. Generally, the switch logic 112 performs processing of the incoming data within the ingress pipeline 404, determines a destination of the data using the Ethernet packet memory 406, and performs processing of the outgoing data within the egress pipeline 408. As will be appreciated, various examples of the structure and function of the switch logic 112 are well-known, and are not discussed here in further detail.

Upon egress, and with the knowledge from the switch logic 112 that the second port 106 is to be used, an interface 404b may be used with the security engine 130b to provide transmitting of the switched data through the cipher key manager 144b and the cryptography manager 146b and out of the Ethernet MAC 304b and the Ethernet PHY 302b through the second port 106. As shown, the second selectable data path 134 may be used, e.g., at a data rate that is the same as the data rate of the first port 104, to perform cipher key-based processing of the data to be transmitted. It will be appreciated that typically the cipher key manager 144b may receive the data before, or simultaneously with, the cryptography manager 146b, so that authentication and encryption may proceed, as shown in more details in FIGS. 5 and 6. However, in the example of FIG. 4, the second selectable data path 134 is illustrated as proceeding through the cryptography manager 146b and then the cipher key manager 144b, in order to illustrate the symmetry of the architecture and to better explain an operation of the third selectable data path 136. In actual implementations, it will be appreciated that the cipher key manager (e.g., 144b) may be consulted first in order to get the keys for the cryptography manager (e.g., 146b).

Specifically, as shown, the third selectable data path 136 allows for leveraging of the security engines 130a, 130b to provide encryption and authentication at the higher data rate of the third port 108 (e.g., 2.5 Gbps or 10 Gbps). As shown, for example, the cipher key managers 144a, 144b may be operated in parallel in order, for example, to perform look-up of an associated cipher key in an expedited manner. Meanwhile, the cryptography managers 146a, 146b may be pipelined, e.g., using a pipeline controller 410, in order, again, to perform encryption in an expedited manner.

The example of FIG. 4 is merely illustrative, and more detailed examples are provided below. It will be appreciated that the manner in which the security engines 130a, 130b are leveraged to support the data rate of the third port 108 may vary, depending on numerous factors, such as the various data rates in question, or the security protocol(s) implemented. For example, where the AES-GCM cipher suite is used by the cryptography managers 146a, 146b, it may occur that portions of the encryption process(es) are pipelined, while other portions are performed in parallel, so that the third selectable data path 136 may include any or all of these data paths.

Figure 5:
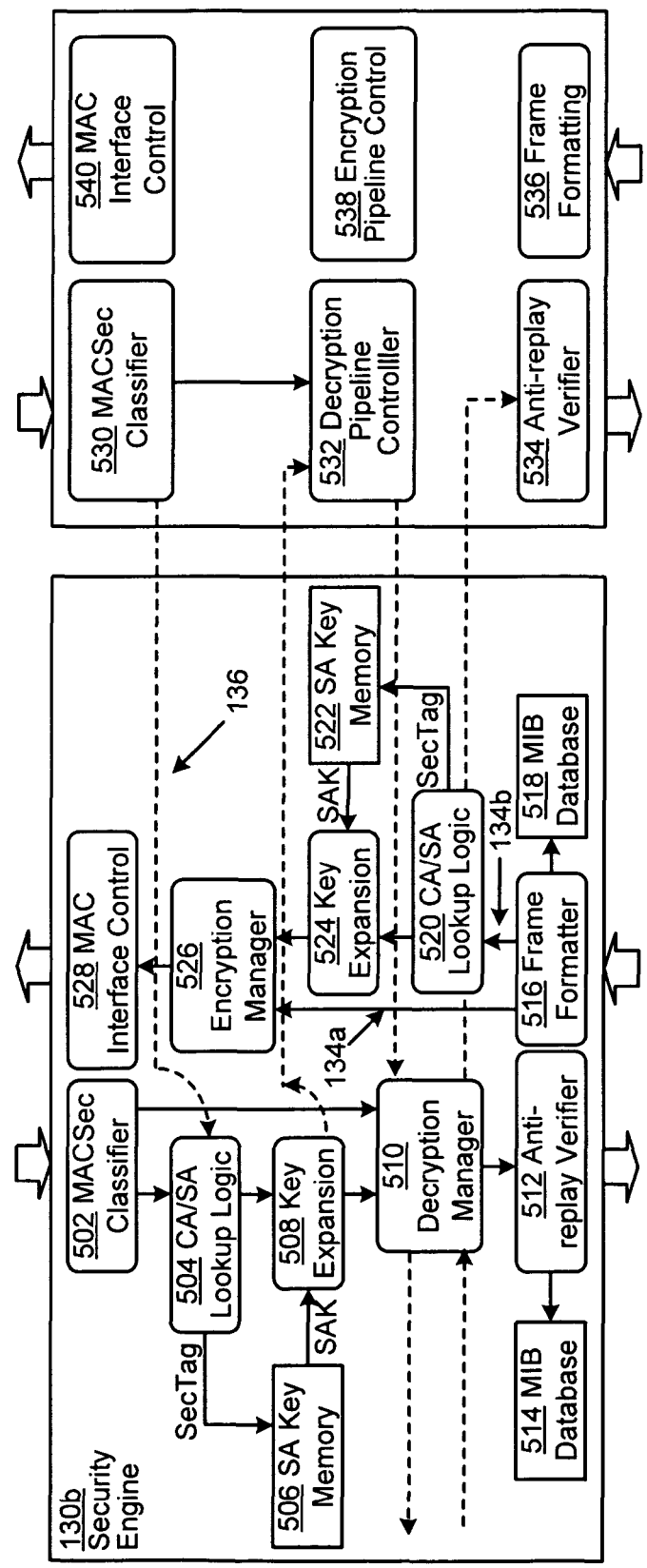
FIG. 5 is a block diagram illustrating a more detailed view of the operation of the network switch of FIG. 4.

FIG. 5 is a block diagram illustrating a more detailed view of the operation of the network switch of FIG. 4. In FIG. 5, the security engine 130b is illustrated as receiving both a transmit and a receive path (although the security engine 130b in the example of FIG. 4 illustrates only a simplified example of a transmit path). In other words, as may be apparent from FIG. 1 and from the above discussion, the security engines 130a, 130b may be constructed essentially identically to one another, and configured to both receive and transmit data traffic in accordance with the MACSec protocol(s).

In FIG. 5, then, the security engine 130b includes a MACSec classifer 502, which is configured to perform an initial classification of incoming data frames. For example, some data frames may be classified as not requiring MACSec, and may be immediately passed through or discarded (based, for example, on header information including the in the data frame(s)). Other data frames are classified as requiring, in this case MACSec decryption.

Accordingly, lookup logic receives the data frames classified for MACSec decryption, and performs a lookup for a connectivity association and/or security association of a cipher key associated with the incoming data frames. More specifically, the lookup logic 504 may be configured to pass the SecTAG 310 to a SA key memory 506 where the SecTAG 310 may be matched against each of a number of available security associations to determine a corresponding security association key, or SAK. Example operations for performing this lookup, and examples of the SA key memory 506, are provided in more detail below, e.g., with respect to FIG. 8.

Once determined, the cipher key (SAK) is passed to key expansion logic 508. As is also described below, a given cipher key SAK may be used in multiple iterations, or rounds, of encryption/decryption. The key expansion logic 508 is therefore configured to break down each cipher key SAK into a plurality of (sub) cipher keys, or round key(s), where each sub cipher key may then be used in a corresponding round of decryption, e.g., by decryption manager 510.

Then, prior to passing the authenticated/decrypted frame, an anti-replay verifier 512 performs verification against a replay attack (in which previously authenticated frames are re-transmitted to the security engine 130b for malicious reasons). Details of replay attacks and operations of MACSec against replay attacks are known, and are not discussed here in further detail.

An MIB database 514 may be updated with information corresponding to the processing of received frames, as referred to above, so as, for example, to track management information such as how many frames are dropped and/or suspicious. For transmitted frames, a frame formatter 516 is configured to perform initial formatting of the outgoing frames, such as padding or truncating the frame(s). The frame formatter 516 may then update a separate MIB database 518 for tracking management information about transmitted data frames.

Then, lookup logic 520 may be used to analyze the frame and determine, for example, a corresponding security association, from which a SecTAG may be determined and used to access a SA key memory 522. Thus, a corresponding security association key (SAK) may be passed to key expansion logic 524, so that, again, multiple rounds of encryption may be carried out by encryption manager 526. Finally in the security engine 130b, the now-encrypted frame, including the SecTAG, may be passed to a MAC interface control 528, which, as should be apparent from FIG. 4, interfaces with the Ethernet MAC 304b.

Thus, in FIG. 5, it will be appreciated that the second selectable path 134 includes, for example, the data path(s) between the frame formatter 516 and the MAC interface control 528. That is, more than one data path may be included in the second selectable path 134, since, for example, the data itself follows a path 134a from the frame formatter 516 to the encryption manager 526, while the encryption-related information travels in parallel through the lookup logic 520, SA key memory 522, and/or the key expansion logic 524, using data path 134b. Thus, it may be appreciated that in example implementations, the lookup logic 520, SA key memory 522, and/or the key expansion logic 524 (along with similar elements lookup logic 504, SA key memory 506, and/or the key expansion logic 508 on the receive side) may be considered to be elements of the cipher key manager 144b, while the encryption manager 526 (and decryption manager 510 on the receive side) may represent the cryptography manager 146b.

FIG. 5 thus illustrates an example in which the security engine 130b is configured to use the second selectable data path 134 at a relatively lower data rate. However, FIG. 5 also illustrates, by way of dashed lines, the third selectable data path 136. As shown, the third selectable data path 136 allows frames received from the Ethernet MAC 304c of FIG. 4 to undergo classification at a MACSec classifer 530, and then to undergo security association key lookup as explained above. As appreciated from FIGS. 4 and 5, however, the third selectable data path may leverage not just the lookup logic 504, SA key memory 506, and/or the key expansion logic 508, but also may use corresponding elements within the security engine 130a, so as to perform frame processing for the third (faster) data rate using both the security engines 130a, 130b.

Somewhat similarly, a decryption pipeline controller 532 may be used to control a pipelining of, in this case, the decryption manager 510 and a corresponding decryption manager within security engine 130a. Then, an anti-replay verifier 534 may operate on the decrypted frames to ensure against a replay attack, as described above for the anti-replay verifier 512.

The operation of the third selectable data path 136 is illustrated on a receive operation; however, it will be appreciated that a corresponding transmit operation as described above for the second selectable path 134 also may be executed for the third selectable data path 136, using a frame formatter 536, an encryption pipeline controller 538, and a MAC interface controller 540. In other words, except where otherwise specified, an operation of the third selectable data path may be substantially similar to the (slower) operations of the first or second selectable data paths 132, 134, but leveraging the resources of those two data paths 132, 134 so as to operate at the higher data rate of the third port 108.

Figure 6:
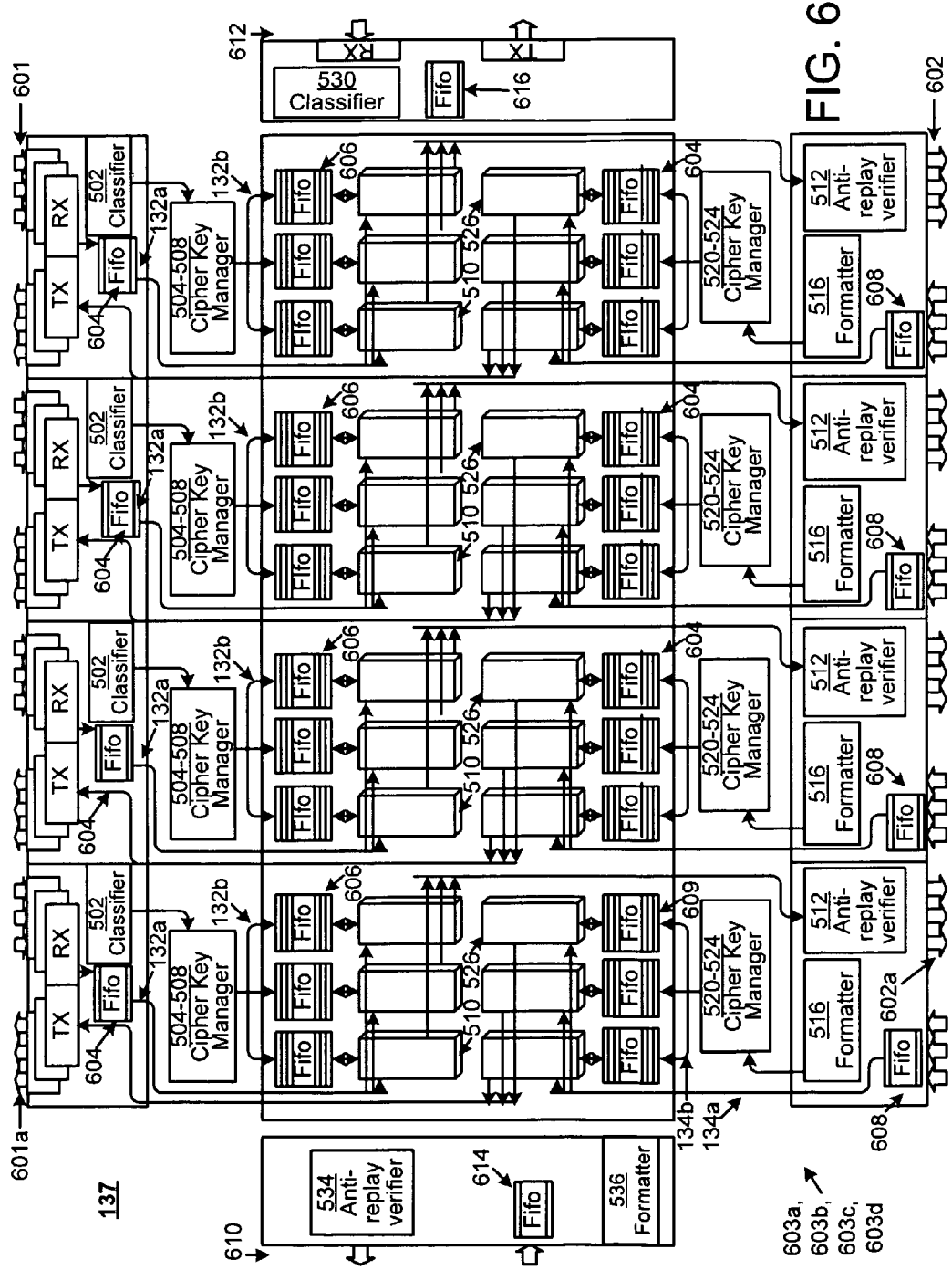
FIG. 6 is a block diagram of an example implementation of the multi-data rate architecture of FIG. 1, configured for relatively slower data rates.

FIG. 6 is a block diagram of an example implementation of the multi-data rate architecture 137 of FIG. 1, configured for relatively slower data rates. In FIG. 6, many of the illustrated elements represent identical or similar elements as already described, or represent conventional elements, and thus are not necessarily discussed here in detail. Rather, FIG. 6 is intended to illustrate an example of an overall structure of the security architecture 137, designed to support 12 ports of the network switch 102 in a fast, efficient, and configurable manner.

Specifically, 12 ports 601 are illustrated at a top of FIG. 6 that correspond to 12 physical ports of the network switch 102. Similarly, 12 ports 602 are illustrated at a bottom of FIG. 6 that correspond to the 12 physical ports. Thus, the ports 601 and 602 correspond to transmit and receive ports of the security architecture 137; e.g., ports 601a illustrate three outgoing or transmit ports while ports 602a illustrate three incoming or receive ports, and a transmit/receive function of the remaining ones of the ports 601/602 should be apparent from FIG. 6.

In FIG. 6, the security architecture 137 includes four security architecture clusters, referred to herein as clusters, including 603a, 603b, 603c, and 603d. Each of the four clusters 603a-603d include a set of three of the transmit ports (e.g., ports 601a), as well as a set of three of the receive ports (e.g., ports 602a). Accordingly, the four clusters 603a-603d, each with three of the ports 601/602, provide network security for a total of 12 physical ports (such as the ports 104, 106, 108 of FIG. 1).

Each of the four clusters 603a-603d is substantially identical in FIG. 6, which contributes to an ease of manufacture and an increased reliability and space-savings of the security architecture 137. Therefore, the below discussion is primarily devoted to the cluster 603a, but it will be appreciated that similar comments may apply to clusters 603b-603d.

In the cluster 603a, the cipher key manager 504-508 references and illustrates corresponding elements of FIG. 5, e.g., the look-up logic 504, SA Key memory 506, and expansion logic 508, which, as described above, may illustrate possible components of the cipher key manager 144a of FIG. 1. The cluster 603a also includes three decryption managers 510, which, as explained, is itself an example of the cryptography manager 146a of FIG. 1.

In operation, frames received through appropriate ones of the ports 601 are classified at the classifier 502 and key tag information (e.g., the SecTAG 310) is passed to the cipher key manager 504-506, where those elements perform their respective functions as described herein. Meanwhile, the frames also may be passed to a first-in, first-out (Fifo) buffer 604, and the corresponding data (unless otherwise classified by the classifier 502) is passed to the decryption managers 510.

Cipher key information from the cipher key manager 504-508 is passed to additional Fifo buffers 606, which correspond in number to the decryption managers 510. Thus, the first selectable data path 132 includes a path 132a for data and a path 132b for cipher key information. Both of these data paths 132a, 132b go to/through at least one of the decryption managers 510, each of which uses the cipher key information to process (e.g., decrypt and/or authenticate) the data for passing to the anti-replay verifier 512 and subsequent passing to the switch logic 112.

Thus, the cluster 603a represents an implementation of the security engine(s) 130a, 130b of FIG. 1 in which a single cipher key manager 144a (i.e., the cipher key manager 504-508) is shared between (e.g., performs key look-up for) three cryptography managers 146a (i.e., the decryption managers 510). In other implementations, there may be a single cipher key manager for each cryptography managers (i.e., a one-to-one correspondence), or some other ratio, depending on a relative speed of the operation(s) of the different elements thereof.

Similarly, on a transmit side, a Fifo buffer 608 may pass data along the second selectable path 134a to encryption manager(s) 526, while the formatter 516 passes formatted data to the cipher key manager 520-524 (i.e., the cipher key manager 144b of FIG. 1), for determination of cipher key information that is then distributed using Fifo buffers 609 and the second selectable data path 134b to the appropriate encryption manager(s) 526, for encryption of the corresponding data and outputting to the appropriate one of the transmit ports 601a.

Thus, the three ports 601a and 602a may each be used to transmit/receive data at a first/second data rate, e.g., 1 Gbps. As appreciated from the discussion herein, the various elements of the cluster 603a may be leveraged to provide switching at a higher data rate. For example, only a first one of the ports 601a (and a first one of the ports 602a) may be turned on (with the other two ports of each three-port grouping turned off), and may use all of the resources of the cluster 603a to perform switching at a higher data rate (e.g., 2.5 Gbps). For example, the cipher key manager 504-508 may process incoming frames at this higher data rate, and the decryption managers 510 may be pipelined and/or operated in parallel so as to leverage their respective resources for higher-speed processing therewith.

Still further, some or all of the four clusters 603a-603d may be operated together to provide network security at an even higher data rate, e.g., 10 Gbps. For example, ports 610 and 612 may correspond to at least one 10 Gbps port (e.g., the third port 108), and, as shown and as appreciated from FIG. 5, may include or be associated with corresponding elements such as the classifier 530, anti-replay verifier 534, and formatter 536. Other elements, such as Fifo buffers 614, 616, also may be used in a manner similar to corresponding elements in the lower data rate scenarios (e.g., the Fifo buffers 606, 608). Specific examples of the third selectable data path 136 for operating at this higher data rate are provided in more detail below, with respect to FIG. 7.

In general, however, it will be appreciated that the example security architecture 137 of FIG. 6 (which may be implemented, for example, as a SecY module of MACSec), may be designed to support multiple data rates in at least three different modes/configurations, and, as will be appreciated from the above discussion, these three modes may include 12×1 Gbps full-duplex ports, 4×2.5 Gbps full-duplex ports, and 1×10 Gbps full-duplex port.

As shown and described, the 12×1 Gbps data path may be overlaid on top of the 1×10 Gbps data path. The twelve 1 Gbps ports are organized into four groups for the four clusters 603a-603d, with each group containing three ports that are each designed as data path slices. The cryptographic data path is replicated twenty-four times to serve the twelve full-duplex ports concurrently. The SA memory 506/526 is organized into eight different groups, each serving three ports.

Figure 7:
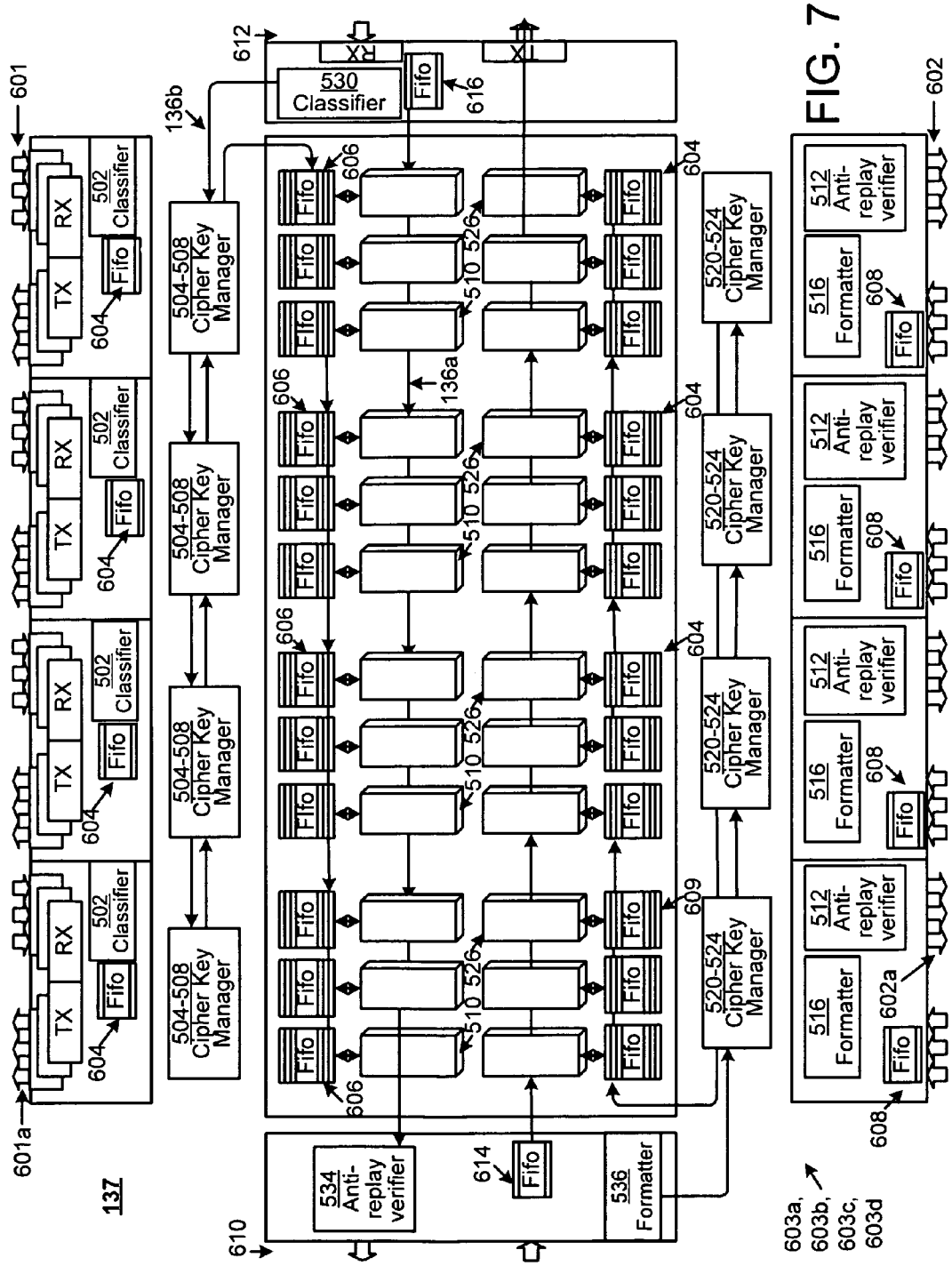
FIG. 7 is a block diagram of an example implementation of the multi-data rate architecture of FIG. 1, configured for relatively faster data rates.

FIG. 7 is a block diagram of an example implementation of the multi-data rate architecture of FIG. 1, configured for relatively faster data rates. More specifically, and continuing the example above, FIG. 7 illustrates the third selectable data path 136 implemented as part of a perpendicular (e.g., horizontal) data path.

As shown, the 10 Gbps data path, i.e., the third selectable data path 136a and 136b, runs horizontally using eleven identical pipeline stages (i.e., eleven of the twelve available encryption/decryption managers 526/510) to achieve the 10 Gbps data rate of this example. As described in more detail below, eleven stages are used with the assumption of using the AES cipher algorithm(s), which includes ten rounds plus an additional initial round. However, if other cryptographic techniques are used, then a number and configuration of the decryption/encryption managers 510, 526 may vary accordingly. In related example implementations, a system interface and MAC interface of the 10 Gbps port may be logically separated from the twelve 1 Gbps ports 601/602, and may be physically separated for the convenience of integration of the microchip 110.

Figure 8:
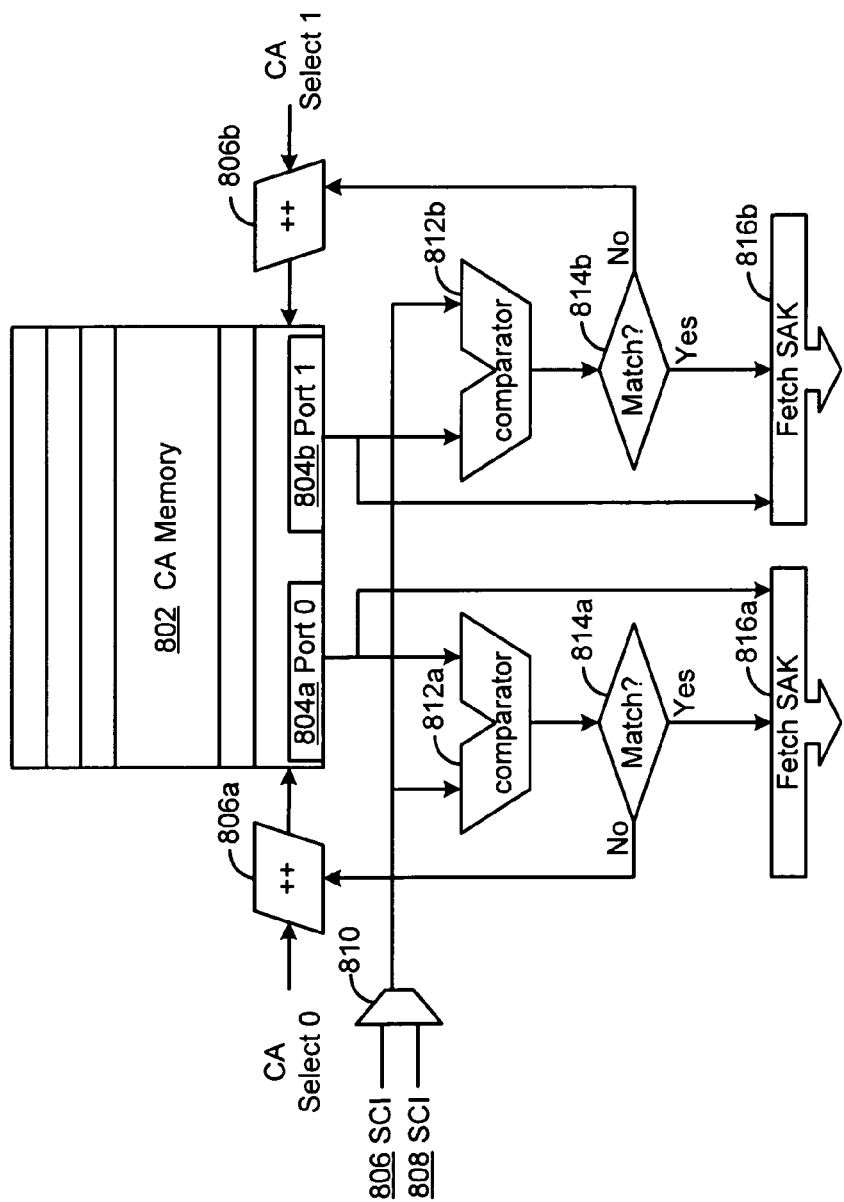
FIG. 8 is a block diagram illustrating look-up logic used in the security architecture of FIG. 1.

FIG. 8 is a block diagram illustrating look-up logic used in the security architecture 137, e.g., the look-up logic 504, 520 within the cipher key managers 504-508, 520-524. As is apparent from FIGS. 6 and 7, although not explicitly shown in FIG. 8, the SAK memories 506/522 may be replicated four times, once each for the four clusters 603a-603d, so that the look-up logic 504/520 may access all four of the memories (memory clusters) 506/522. The distributed organization of the memories 506/522 eases any arbitration issues and/or routing congestion that may be associated with serving 12×1 Gbps ports concurrently (e.g., when the first and second selectable paths 132, 134 are selected). In the example implementations described and illustrated herein, this organization of the memories 506/522 allows a set of up to eight CAs to be associated with each port for the 12×1 Gbps configuration, or a set of up to thirty-two CAs to be associated with each port for the 4×2.5 Gbps or 1×10 Gbps configurations.

In FIG. 8, discussion is first provided with respect to an example 1 Gbps implementation, in which a set of up to eight CAs is associated with a port of the 12×1 Gbps implementation of FIG. 6. Also, in the following discussion, it should be appreciated that in MACSec, the SecTAG 310 of FIG. 3 may include information used to identify a correct CA and corresponding SA, and, ultimately, a corresponding cipher key (SAK). For example, in each CA, two security associations (SA) can be supported, providing one SA for each traffic direction. During an SA lookup process, the logic of which is illustrated in FIG. 8, the CA set is identified by a port number provided using a Secure Channel Identifier (SCI) field within the SecTAG 310. In other words, the identified (SCI) port number from the SecTAG 310 may be used to determine a correct CA, where the SCI is the concatenation of the 48-bit Source Address (SA), and the SCI port number in the SecTAG 310. The concatenation of the SCI and a two-bit security association number (known as the AN field of the SecTAG 310) may be used to form an SA identifier.

Thus, a first possible CA may be selected and retrieved from the CA memory 802 using a memory port of the CA memory 802 (illustrated generically as port 0 (804a)), and thereafter the CA memory 802 may be incremented (806a) through the set of eight possibilities until a correct CA (i.e., matching the incoming frame) is determined. In the example of FIG. 8, a duplicate port, port 1 (804b) may simultaneously output one of the eight possible CA selections, so that the process of cycling through the eight possible CAs may be accomplished in a maximum of four cycles.

More specifically, the frame SCI may be compared against all SCIs of the same set of CAs, as described below, so that one CA can be selected and the SAK may be fetched using the SA identifier (e.g., the AN number just referenced).

The CA lookup may use a set-associative method for each port, where, as described, a CA set that contains eight CAs may be assigned to a port. The CAs may be stored in the CA memory 802 as two 72-bit words in a 64/72 dual-port memory. The 72-bit memory width allows a 64-bit SCI with additional configuration bits to be fetched in a single cycle on every port.

The first word of the CA may thus contain the SCI to be compared, as well as a valid status of the CA and the AN number to track the SAK in use. In these example implementations, then, the incoming CA may be matched using SCI 806 that arrives at the example data rate of 1 Gbps. However, as described below, incoming SCI(s) 808 also may arrive at other data rate(s), such as at 10 Gbps. A multiplexer 810 may be used to select between the two available SCIs 806/808, where the multiplexer 810 may be understood to be configurable by the LMI 152, register access control logic 150, and control register(s) 148 of FIG. 1.

Continuing first with the example of the 1 Gbps SCI 806, it may be seen that a static comparator 812a may be used to compare the SCI against the (first word of) the selected CA from the port 0 804a, and, if a match does not occur (814a), then the next CA selection may be incremented (806a) until a match is obtained (814a). At this point, the SAK may be fetched (816a) from the SAK memory 506/522, e.g., using the AN number and/or SA identifier. Again, it will be appreciated that similar comments apply to the comparator 812b, matching (814b), incrementing (806b), and fetching (816b) of FIG. 8, in order to decrease an amount of time required to find whether a match exists for the incoming CA(s).

A 10 Gbps port may take advantage of the static comparators 812a, 812b in each of the four memory clusters, so that 32 CAs may be looked up concurrently. The 10 Gbps channel may thus be utilized to support applications such as EPON, where a large number of CAs may be associated with each port. More generally, then, the operations of the look-up logic 504/520 may be substantially the same for different data rates, except that for higher data rates, different ones of the look-up logic 504/520 within the clusters 603a-603d may be operated in parallel to maintain the desired data rate.

Figure 9:
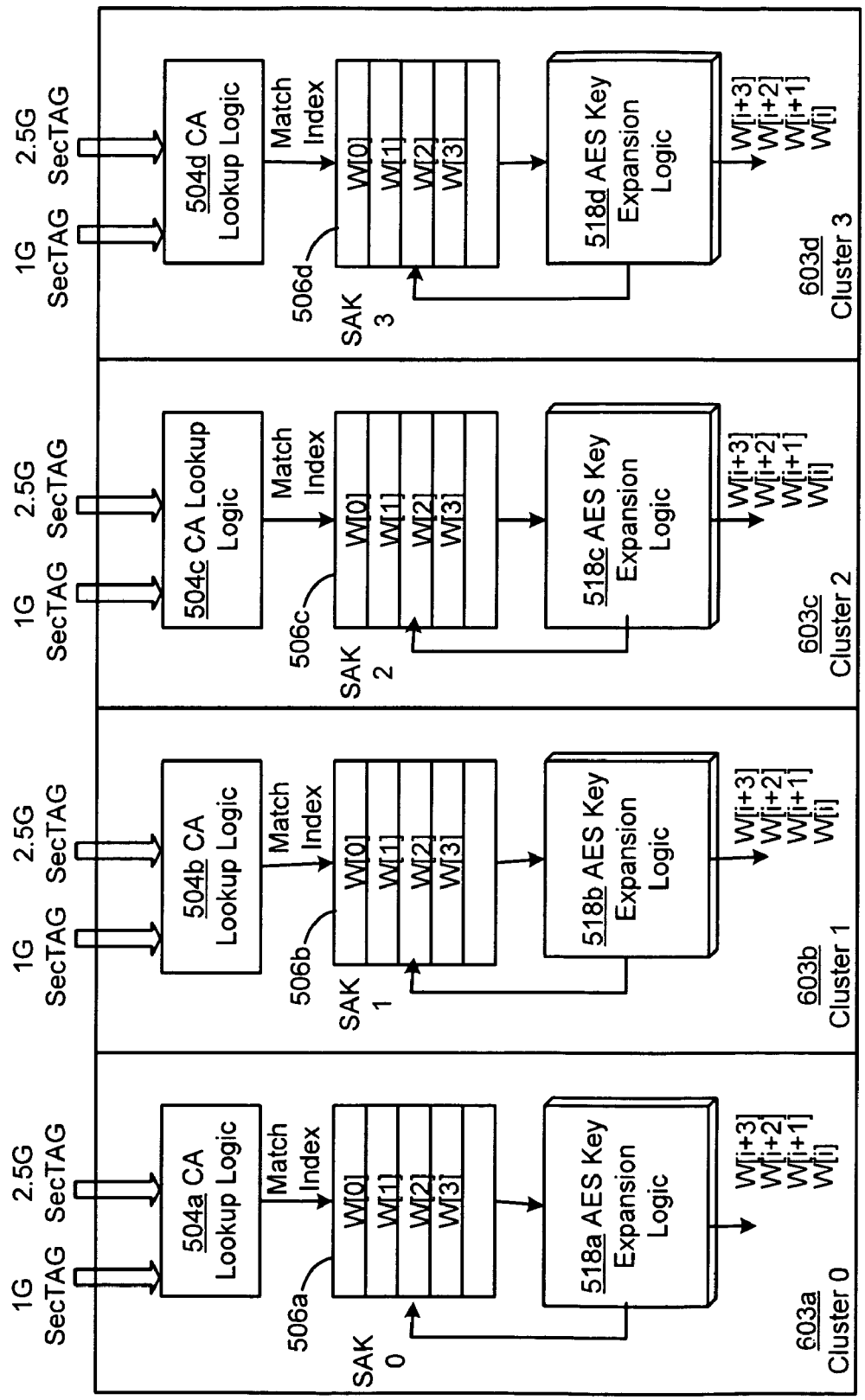
FIG. 9 is a block diagram illustrating operations of key expansion logic used in the example implementations of FIGS. 5 and 6.

FIG. 9 is a block diagram illustrating operations of key expansion logic used in the example implementations of FIGS. 5 and 6. More specifically, FIG. 9 illustrates an example in which each of the clusters 603a-603d includes corresponding look-up logics 504a-504d, SAK memories 506a-506d, and AES key expansion logic 518a-518d, respectively, as shown.

In the example implementation of FIG. 9, data may be processed at 1 Gbps, as described above with respect to FIG. 6. Consequently, as shown, each of the CA look-up logics 504a-504b receive corresponding SecTAG(s) at 1 Gbps each, and operate to fetch one or more corresponding security association keys (SAKs), as just described above with respect to FIG. 8. Once an appropriate match is found, then the resulting identifier may be used to fetch a corresponding key(s) which is then fed into the AES expansion logic 518a.

In the example of FIG. 9, the SAK memory 506a stores a specific 128 bit key SAK0 as four, 32 bit words, i.e., W[0], W[1], W[2], and W[3]. Since the full 128 bit key is retrieved one 32 bit word at a time, it takes four cycles to retrieve the entire 128 bit key. Thus, as shown in FIG. 9, the AES key expansion logic 518a iterates through four readings of the SAK memory 504a to obtain the full 128 bit round key, and produces the 128 bit round key every four cycles. It should be apparent from conventional AES settings/contexts that the AES expansion logics 504a-504d may construct a 128 bit round key from the relevant 32 bit words, where generation of the 128 bit round key depends on a combination of each 32 bit key in a manner that depends on the previous 32 bit key (e.g., the expansion of SAK0 at the AES key expansion logic 504a depends on inclusion of the W[0] case to generate the W[1] case).

As shown, a similar process may be implemented for the 2.5 Gbps case. In this case, the cluster 603a may be configured to operate in the manner just described, but at a data rate that is suitable for the 2.5 Gbps traffic. Then, in both cases, the resulting, expanded round keys may be fed into the key buffers 606.

Figure 10:
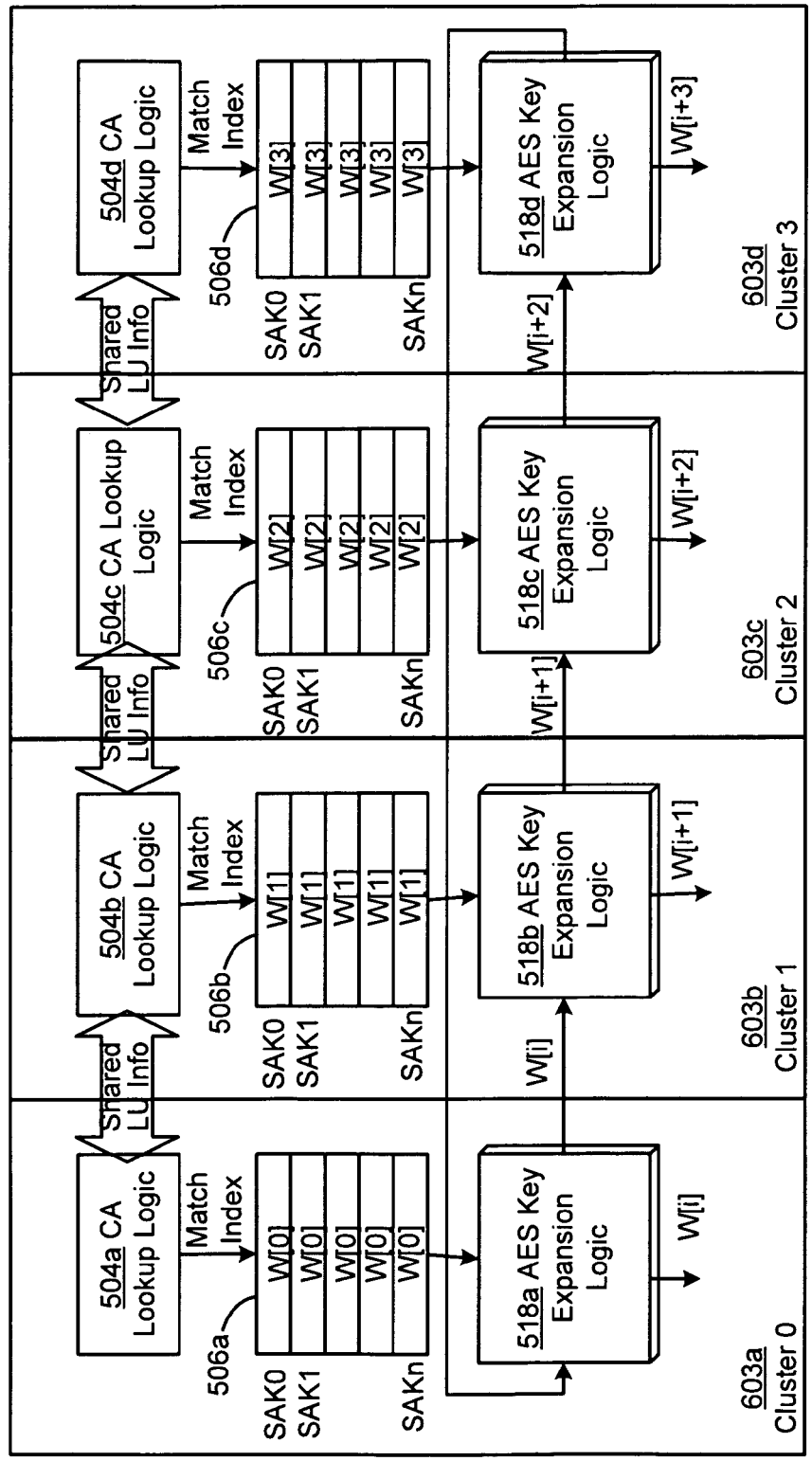
FIG. 10 is a block diagram illustrating operations of key expansion logic used in the example implementations of FIGS. 5 and 7.

FIG. 10 is a block diagram illustrating operations of key expansion logic used in the example implementations of FIGS. 5 and 7. That is, FIG. 10 illustrates a similar operation(s) as just described, but in the context of use of the 10 Gbps third port 108 (and associated, third selectable data path 136).

In FIG. 10, the four 32 bit words of each cipher key (SAK) are stored in an interleaved fashion within the SAK memories 506a-506d. That is, as shown, the cipher key SAK0 includes a 32 bit word W[0] in the memory 506a, a 32 bit word W[1] in the memory 506b, a 32 bit word W[2] in the memory 506c, and a 32 bit word W[3] in the memory 506d. Similar comments apply to SAK1 ... SAKn.

Such interleaving thus provides an example by which an increased data rate may be achieved for performing high-speed key expansion. In order to make use of the interleaved nature of the storage of the cipher keys (SAKs), both the CA look-up logic(s) 504a-504d and the AES key expansion logic(s) 518a-518d communicate among themselves.

For example, as shown, the CA look-up logics 504a-504d all share relevant look-up information, so that each look-up logic may read and fetch its corresponding 64 bit word that acts as an index, e.g., an SAK0 index, that matches the received SecTAG (index). For example, if a SecTAG (index) is received at the CA look-up logic 504a identifying a match between the SCI received and the locally-stored SCI that corresponds to cipher key SAK0, then this SAK0 index by itself may not allow the remaining CA look-up logics 504b-504d to obtain their corresponding 32 bit words of the SAK0.

Instead, the SAK0 index may be broadcast to, or otherwise shared among, the CA look-up logics 504a-504d. Consequently, as shown, the CA look-up logic 504b fetches W[1] of the SAK0, while the CA look-up logic 504c fetches W[2] of the SAK0, and the CA look-up logic 504b fetches W[3] of the SAK0.

As W[i] (e.g., the first word of any of a number of possible cipher keys) is received and processed at the AES key expansion logic 518a, it is then passed to the AES key expansion logic 504b. This process continues, including providing of the key W[i+3] back to the original AES key expansion logic 518a. In this way, the interleaved cipher key(s) SAK may be read from the SAK memories 506a-506d in a manner that makes use of the available hardware/software to provide an improved data rate than may be obtained by any of the individual clusters 603a-603d. Moreover, the described and illustrated example(s) provide an illustration of possible use of these available resources in which the generation of a next 32 bit word by the AES expansion logic depends on an outcome of a previous 32 bit word (e.g., as shown, W[i+1] depends on an outcome associated with W[0]).

Thus, in the example of FIG. 10, each 128 bit round key may be generated in one cycle. The distributed organization of the clusters 603a-603d also allows the AES key expansion logic to be associated with each cluster and shared by all three ports (e.g., in the configuration of FIG. 7). Area-optimized key expansion logic can be used to match the total packet rate of the associated ports. Additionally, the separation of CA/SA memory organization allows the CA lookup and the SAK expansion to be handled in pipelined manner, as shown.

Although specific implementations have been, discussed for the sake of example, many other implementations are possible, as well. For example, the look-up logic(s) 504a-504d may be implemented so as to perform multiple CA lookup using limited number of static comparators in multiple clock cycles, while in other examples, a content addressable memory (CAM) may be used in the look-up logic 504a-504d, and/or hash-based look-logic may be used. In other examples, instead of communicating with one another, as shown in FIG. 10, the CA look-up logics 504a-504d may each be interconnected with all of the AES key expansion logics 518a-518d, or there may be just a single look-up logic that broadcasts results to the AES expansion logics 518a-518d.

Figure 11:
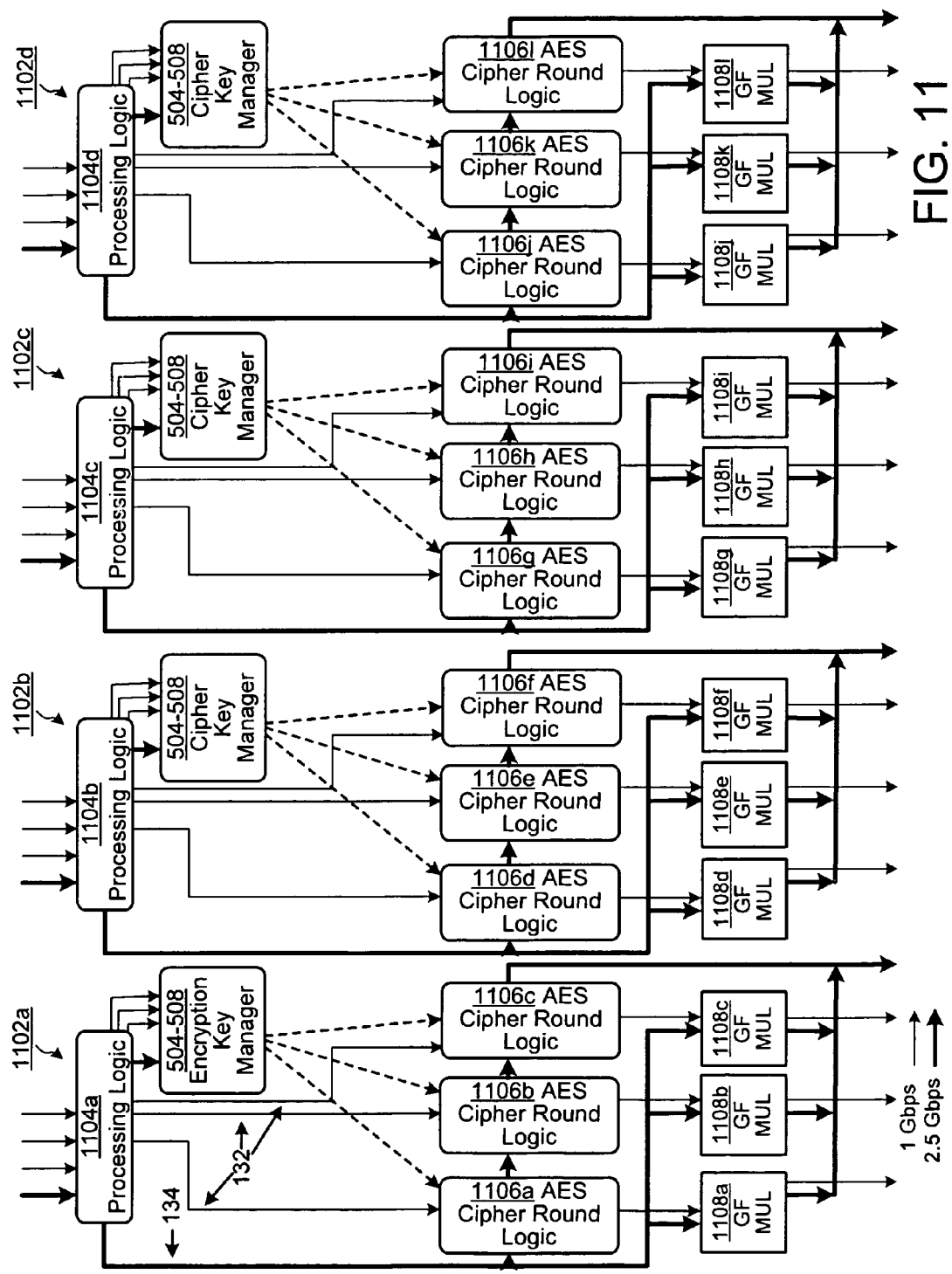
FIG. 11 is a block diagram of example cryptography managers that are configured to perform cryptographic processing at a plurality of data rates.

FIG. 11 is a block diagram of example cryptography managers, such as the cryptography manager(s) 146A and/or 146B, that are configured to perform cryptographic processing at a plurality of data rates. For example, as described above, the first selectable data path(s) 132 may be processed at a rate of 1 Gbps, while the second selectable data path 134 may perform cryptographic processing at 2.5 Gbps. An example of the third selectable data path 136 (e.g., at 10 Gbps) is illustrated in the same or similar context, for example, with respect to FIG. 12, below.

In FIG. 11, four modules 1102a, 1102b, 1102c, and 1102d are illustrated that include a plurality of cryptography managers, as described in more detail, below. The four modules 1102a, 1102b, 1102c, and 1102d are associated, respectively, with processing logic 1104a, 1104b, 1104c, and 1104d, as well as with cipher key managers 504-508. For example, the processing logic 1104a, 1104b, 1104c, and 1104d may include some or all of the ingress processing elements of FIGS. 5 and 6, e.g., the classifier 502, or the fifo buffer 604. As these and other elements, including the cipher key manager 504-508, are discussed in detail above, they are not discussed explicitly here. Rather, it will be appreciated that some or all of the above-discussed key management techniques may be used, or that conventional key management techniques may be used.

In FIG. 11, a plurality of stages of cipher round logic 1106a-1106l are illustrated as AES cipher round logic stages. The AES algorithm, as referenced above, is an example of an encryption process that, by itself, is well-known. Generally speaking, however, the AES algorithm may be considered to process incoming (plaintext, unencrypted) data in blocks of 128-bit, 192-bit and/or 256-bit sizes, or other sizes. The AES ciphering is done repeatedly in a round function, where the data is manipulated as a two-dimensional byte array. Each round key is derived from the AES cipher key, e.g., the cipher key(s) described above, which may be, for example, 128-bit, 192-bit or 256-bit in size (although discussed primarily in the present description as 128-bit). In other words, the key expansion processes of FIGS. 5, 6, 9 and 10 may be used to expand a single cipher key into, for example, ten or more round keys, so that one (different) round key may be used for each round of the AES cipher round logic.

When operating in what is known as a counter mode, one or more of the AES cipher round logic 1102a-1102l may encrypt a sequence of counter values in order to generate a pseudo-random key stream. The key steam may then be added together with the plaintext data stream to obtain the encrypted data stream, i.e., the ciphertext. The AES-GCM mode combines counter mode based encryption with GHASH based message authentication (e.g., using a Galois Field multiplier for the ICV hash computation, as explained below), the latter being provided in association with multipliers 1108a-1108l. For example, an entire cipher payload may be authenticated, and optionally a portion of the data payload may be encrypted. As just referenced, the counter mode encryption may use, for example, a 128-bit AES cipher key, and the GHASH authentication may use a 128-bit hash key derived from the cipher key. The GHASH authentication may be based, for example, on Galois Field multiplication in $GF(2^{28})$, which is a known technique.

In FIG. 11, each module 1102a-1102d may use a 64-bit datapath design of AES. Thus, depending on clock speed, each cipher round logic 1106a-1106l may process 128-bit data in every 20 clock cycles (e.g., for a design clocked at 250 MHz, where each round is processed in two clock cycles on the same hardware). For example, at the 1 Gbps rate, the processing logic 1104a of the module 1102a may receive three separate data streams at 1 Gbps each (and each corresponding to a port of the network switch 102), and may communicate with the cipher key manager 504-508 to look-up, expand, and output the cipher key for each data stream.

Then, since (as just explained), the cipher round logic stage(s) perform a plurality of rounds of cryptographic processing, it occurs that one or more stages (e.g., the cipher round logic 1106a) should be able to execute for (e.g., iterate for) each round. For example, as described in more detail below with respect to FIG. 14, each of the one or more cipher round logic stage(s) 1106a-1106c may output the result of its cryptographic processing, together with a hash key derived from the cipher key, to a corresponding one or more multipliers of the plurality of multipliers 1108a-1108l.

In this regard, the GCM GHASH multiplier(s) 1108a-1108l may represent, for example, a multiplication in $GF(2^{128})$. For example, for a 1 Gbps operation, the multiplier 1108a may represent a one digit-serial GF multiplier that is used for each port (per transmit/receive direction), so that each of the multipliers 1108a-1108l may compute 128-bit GF multiplication in 16 clock cycles.

In short, then, at 1 Gbps, each of the cipher round logic stages 1106a-1106l may work together with a corresponding multiplier 1108a-1108l to perform AES-GCM processing, e.g., for encryption and authentication. For example, a single instance of the first selectable data path 132 may go through the cipher round logic 1106a (iterated once for each round key, or eleven total rounds if an initial key mixing step is included), and may be multiplied with a resulting hash key using the multiplier 1108a (iterated an appropriate number of times corresponding to the number of digits in a data block). A result is the addition of the integrity check value ICV 314 to the corresponding frame of data.

For the second selectable data rate 134, e.g., 2.5 Gbps, three of the cipher round logic stages (e.g., 1106a-1106c) may be chained or pipelined together to achieve the higher data rate. In one example, the data throughput may increase to 128-bit data in every 8 clock cycles (with any dead cycles being filled in). Further, three multipliers (e.g., 1108a-1108c) may be used together for every port (data stream), thereby increasing the throughput, for example, to 128-bit data every 6 clock cycles.

The GHASH operation of the multipliers 1108a-1108l has data dependency between rounds, since, as is known and as is explained in more detail below with respect to FIG. 14, a first ciphertext output of a first round of cryptographic processing is used to perform the hash multiplication for the subsequent round/iteration. For the 1 Gbps data rate(s), and again as described below, an iterative approach at the relevant multiplier may be used to perform the multiplication(s).

For higher data rates, an appropriate number of the multipliers 1108a-1108l may be implemented in parallel (as opposed to being pipelined) in order to achieve the desired level of throughput. For example, at the 2.5 Gbps data rate of the second selectable data path 134 of FIG. 11, group(s) of three multipliers, e.g., 1108a-1108c, may be implemented in parallel, as shown, in order to perform the GHASH multiplication(s) sufficiently quickly to maintain the 2.5 Gbps data rate.

Figure 12:
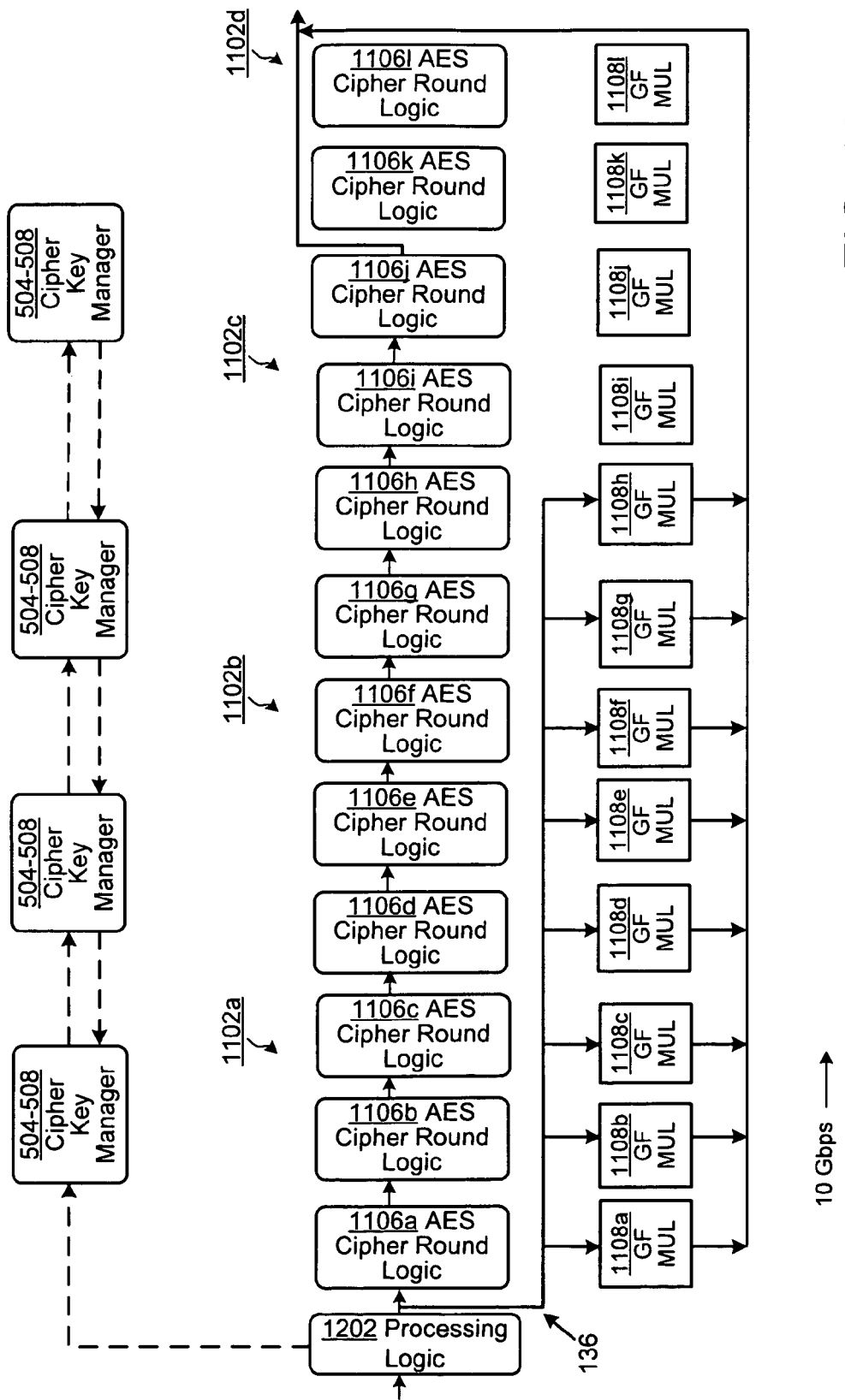
FIG. 12 is a block diagram of the cryptography managers of FIG. 11, configured to perform cryptographic processing at a data rate higher than in the example of FIG. 11.

FIG. 12 is a block diagram of the cryptography managers of FIG. 11, configured to perform cryptographic processing at a data rate higher than the first selectable data rate 132 or the second selectable data rate 134. For example, in the implementation of FIG. 12, the third selectable data rate 136 may be used at a data rate of 10 Gbps.

In FIG. 12, processing logic 1202 is illustrated that represents associated pre-cryptographic processing requirements for such a 10 Gbps implementation, such as formatter 536 or anti-replay verifier 534 of FIGS. 5 and 6. The implementation of FIG. 12 proceeds from the techniques of FIG. 11, e.g., pipelines an appropriate number of stages of the cipher round logic 1106a-1106l, while implementing in parallel an appropriate number of the multipliers 1108a-1108l. Specifically, in the example of FIG. 12, for 10 Gbps, 10 out of the 12 cipher round logic stages 1106a-1106l may be chained or pipelined together, as shown, while the remaining stages are bypassed. Meanwhile, 8 of the 12 multipliers 1108a-1108l are connected in parallel, as is also illustrated. In this case, the data throughput may be increased to 128-bit data in every 2 clock cycles (still assuming the example of a 250 MHz clock signal).

Figure 13:
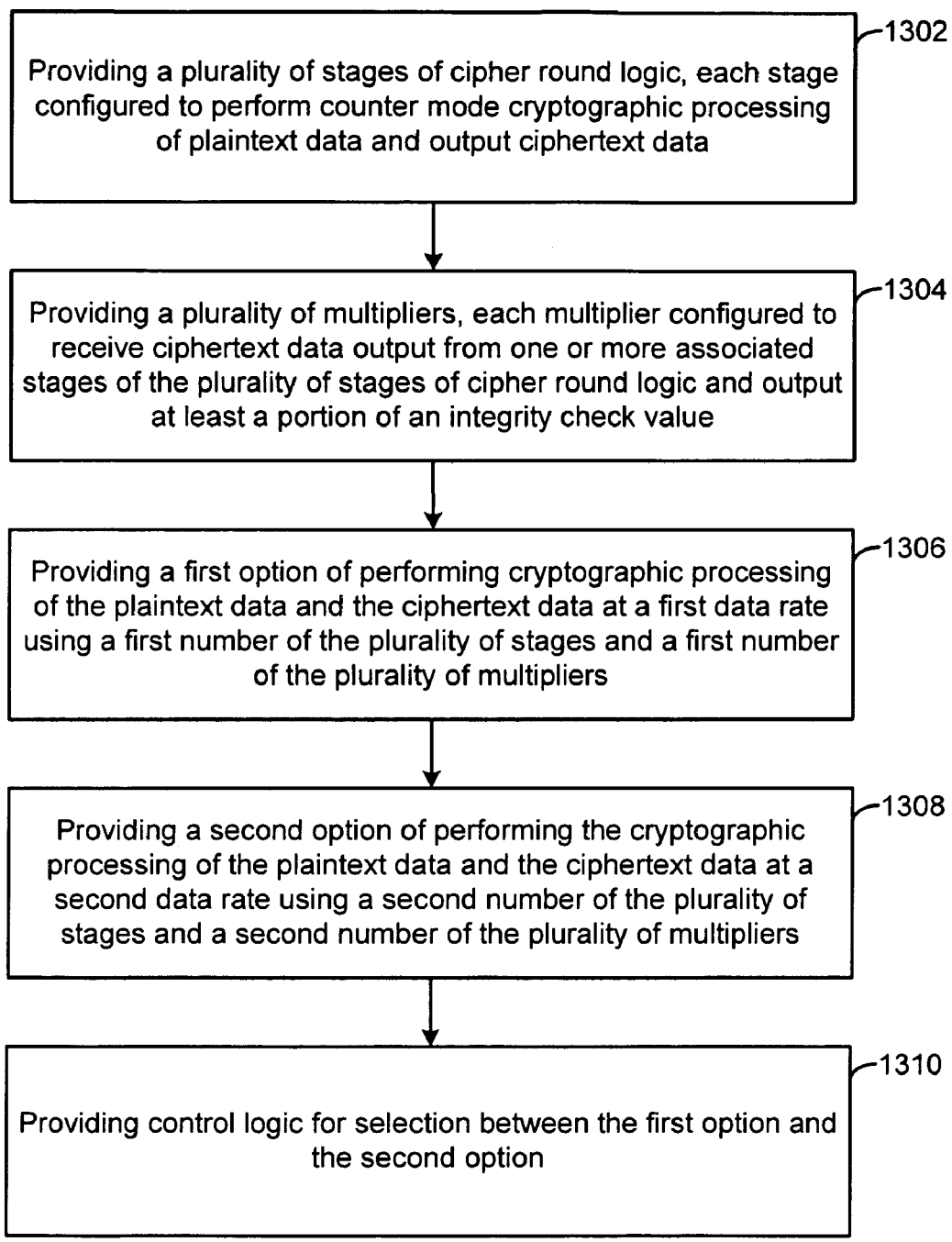
FIG. 13 is a flowchart illustrating example operations for implementing an encryption process in a counter mode, using the architectures of FIGS. 11 and 12.

FIG. 13 is a flowchart 1300 illustrating example operations for implementing an encryption process in a counter mode, using the architectures of FIGS. 11 and 12. The operations allow for the cryptographic processing at multiple possible data rates (e.g., 1 Gbps, 2.5 Gbps, or 10 Gbps), using the same or overlapping hardware elements for each. That is, although FIG. 12 is illustrated separately from FIG. 11 for the sake of clarity, it should be appreciated that the cipher round logic stages 1106a-1106l and the multipliers 1108a-1108l are the same in each illustration, so that the same hardware may be used for any of the three selectable data rates.

In FIG. 13, a plurality of stages of cipher round logic may be provided, each stage configured to perform counter mode cryptographic processing of plaintext data and output ciphertext data (1302). For example, the cipher round logic stages 1106a-1106l may be provided as part of the security architecture 137 of the microchip 110 of FIG. 1. The cipher round logic stages 1106a-1106l may receive the plaintext data, as well as (expanded) cipher/cipher key(s), so as to output ciphertext data.

A plurality of multipliers may be provided, each multiplier configured to receive ciphertext data output from one or more associated stages of the plurality of stages of cipher round logic and output an ICV (1304). For example, as described above, the multipliers 1108a-1108l may be provided as part of the security architecture 137 of the microchip 110 of FIG. 1. At least some of the multipliers 1108a-1108l may receive the ciphertext data from the one or more associated stages 1106a-1106l, and output at least a portion of the ICV 314 of FIG. 3.

A first option may be provided for performing cryptographic processing of the plaintext data and the ciphertext data at a first data rate using a first number of the plurality of stages and a first number of the plurality of multipliers (1306). For example, the first option may include using a single cipher round logic stage and a single multiplier (iteratively, in both cases), such as when the first selectable data path (or the second selectable data path) represents a data rate of 1 Gbps. Or, as another example, the second option may include using three cipher round logic stages and a three associated multipliers, such as when the first selectable data path (or the second selectable data path) represents a data rate of 2.5 Gbps.

A second option may be provided for performing the cryptographic processing of the plaintext data and the ciphertext data at a second data rate using a second number of the plurality of stages and a second number of the plurality of multipliers (1308). For example, where the first option includes using a single cipher round logic stage and a single multiplier, such as when the first selectable data path (or the second selectable data path) represents a data rate of 1 Gbps, then the second option may include using a group of the cipher round logic stages and a corresponding group of the multipliers, such as when the second selectable path represents 2.5 Gbps. Specifically, the cipher round logic stages may be pipelined, as shown in FIGS. 11 and 12, while the multipliers may be executed in parallel.

Control logic may be provided for selection between the first option and the second option (1310). For example, the register access control logic 150 may be used to set the control registers 148 to select between the first option (relatively lower data rate) and the second option (relatively higher data rate). As described above, the local management interface 152 may be used to access and control the register access control logic 150. For example, as described in more detail below with respect to FIG. 14, the control registers 148 may be set to as to activate or deactivate one or more inputs to a multiplexer or other element, so as to activate a desired data path.

Figure 14:
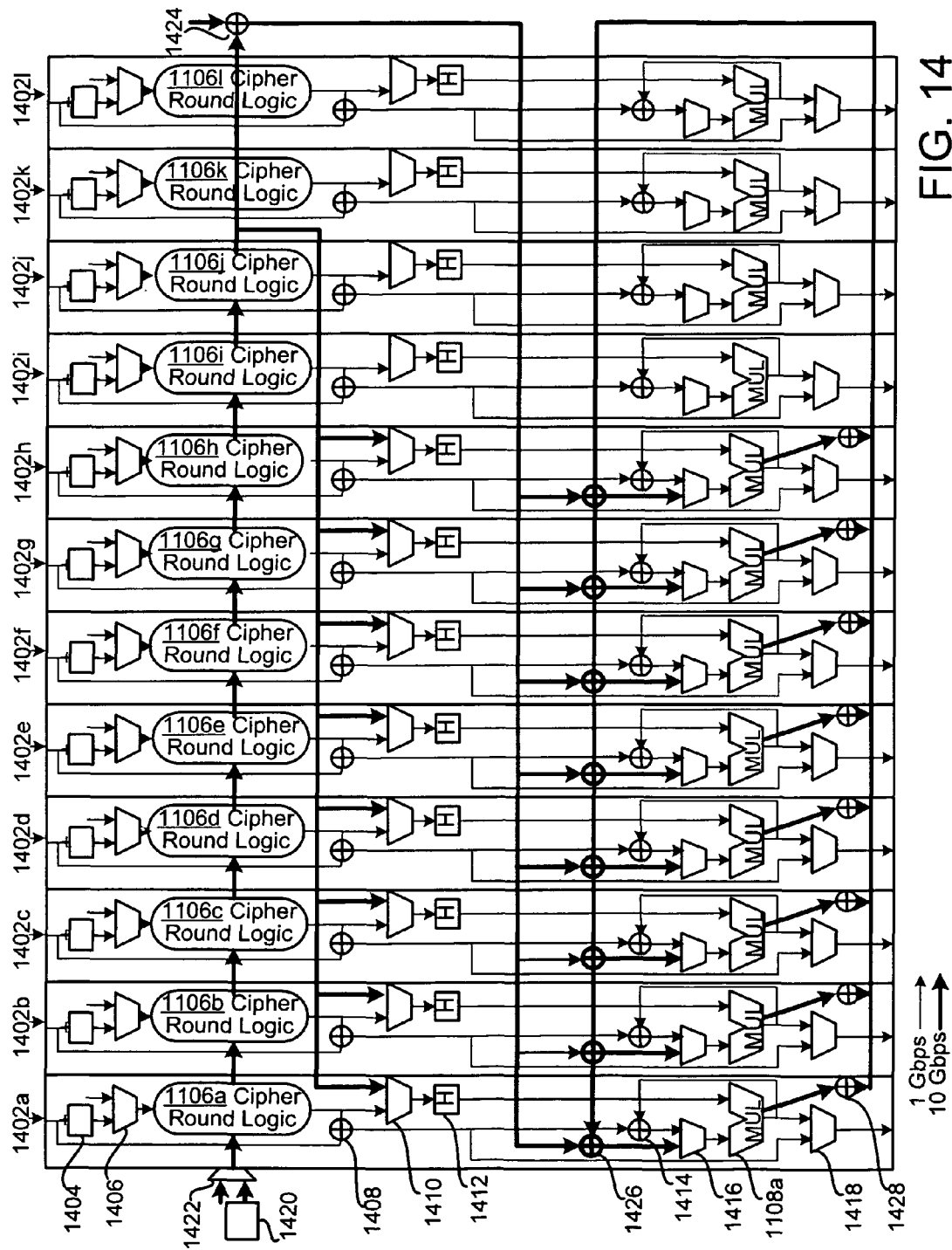
FIG. 14 is a more detailed block diagram of an example implementation of the cryptography managers of FIGS. 11 and 12.

FIG. 14 is a more detailed block diagram of an example implementation of the cryptography managers of FIGS. 11 and 12. In FIG. 14, security modules (e.g., cryptography managers) 1402a-1402l are illustrated as each containing the (AES) cipher round logic stages 1106a-1106l and multipliers 1108a-1108l, respectively (although multipliers 1108b-1108l are not specifically labeled as such in FIG. 14, due to space limitations).

For a first option of performing cryptographic processing at a first data rate, e.g., 1 Gbps, the security module 1402a is described. It will be appreciated that the remaining security modules 1402b-1402l may contain the same or similar elements, and thus may function in the same or similar manner(s).

In the security module 1402a operating in counter mode, a counter 1404 is used to receive plaintext data and produce a count value, or more specifically, a pseudo random key sequence. A multiplexer 1406 receives the count value as well as the cipher (encryption) key and passes both to the cipher round logic 1106a. Meanwhile, the plaintext data is routed to an adder 1408 that also receives the encrypted/cipher text data from the output of the cipher round logic 1106a, and performs an XOR operation therewith.

As shown, then, a multiplexer 1410 may receive a hash key (obtained by encrypting a constant with the cipher key) output by the cipher round logic 1106a, where the hash key may then be stored in a register 1412. Meanwhile, the cipher text data may be passed through an adder 1414 to a multiplexer 1416, and then, together with the hash key from the register 1412, to the multiplier 1108a, which may perform its multiplication function(s) as described herein or as is known, before outputting the ICV 314 to be added to the cipher text data for authentication purposes, using the multiplexer 1418.

It will be appreciated that in such an example(s), the cipher round logic 1106a and the multiplier 1108a may function as described above, e.g., may each require a number of iterations. Similarly, the multiplier 1108a may undergo a number of iterations, since, as referenced above, an output of a next stage of GCM multiplication can not be pipelined. For example, as shown, an output of the multiplier 1108a may need to be routed back to the adder 1414, where an XOR operation occurs, the result of which is passed again through the multiplexer 1416 to the multiplier 1108a.

In this example, then, the illustrated architecture 1402a-1402l may support the first option for cryptographic processing at 12 relatively low data rates (e.g., 1 Gbps each), corresponding to 12 ports on the network switch 102. Meanwhile, as also referenced above, the second option of performing cryptographic processing may be provided by pipelining some or all of the cipher round logic 1106a-1106l, as well as by connecting in parallel a sufficient number of the multipliers 1108b.

In the latter case of the second option, a counter 1420 may be used with a multiplexer 1422 which functions similarly to the counter 1404 and the multiplexer 1406, respectively. Then, the cipher round logic stages 1106a-1106j are pipelined, as described above with respect to FIG. 11. As described above, a hash key may then be output to the register 1412, by selecting the, in this case, 10 Gbps data path using the multiplexer 1410, while the ciphertext data is sent to an adder 1424 (similar to the adder 1408 in function), which receives the output of the cipher round logic stage 1106k along with the plaintext data for forwarding to an adder 1426 and corresponding adders within modules 1402b-1402h (not specifically labeled due to space limitations). These adders output to the multiplexer 1416 (and corresponding multiplexers within modules 1402b-1402h, also not specifically labeled due to space limitations). The multiplier 1108a and corresponding multipliers output to adder 1426 (and corresponding adders within modules 1402b-1402h, again not specifically labeled due to space limitations), which put together the multiplier outputs for feeding back into the multiplier inputs, as shown, as part of the iteration process(es) of the GCM mode described above, e.g., with respect to the single iteration loop between the multiplier 1108a and the adder 1414 described above in the 1 Gbps example.

For example, if the ICV 314 to be output by the multiplier(s) is to be 128 bits, then the output of each individual multiplier may be 16 bits. Then, when the multiplication is finished the appropriate number of iterations, the adder 1426 and/or multiplexer 1418 (and associated adders/multiplexers in modules 1402b-1402h) may aggregate the 16 bit fields to output the 128 bit ICV 314 for addition to the message data.

FIGS. 11-14 thus describe an AES-GCM encryption engine for providing authentication and encryption to a data stream, e.g., as part of a MACSec operation. As described, the figures illustrate that a plurality of data paths may be overlaid on one another using overlapping hardware and hardware functionality, and may be selected as needed, depending on data processing requirements. For example, the local management interface 152 of FIG. 1 may be used to adjust the control registers 148 using the register access control logic 150, so as to set various multiplexers so that one of an, e.g., 1 Gbps, 2.5 Gbps, or 10 Gbps implementation may be chosen.

For example, the multiplexers 1410 and 1414 (and corresponding elements in other modules of FIG. 14) illustrate examples of hardware that provide a network administrator with the option of selecting between 1 Gbps implementation (datapath) and a 10 Gbps implementation (datapath). Of course, this is just one example, and other hardware and architecture configurations may be used, as would be apparent, in order to provide cryptographic processing for a plurality of different data rates. For example, a 3-1 multiplexer may be used, or multiple multiplexers may be used, in order to select between more than two available data rates.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A microchip architecture comprising:
a first selectable data path associated with a first port operating at a first data rate;
a second selectable data path associated with a second port operating at a second data rate;
a third selectable data path associated with a third port operating at a third data rate that is higher than the first data rate and the second data rate;
a first security engine configured to provide cipher key-based security for data associated with the first port using the first selectable path; and
a second security engine configured to provide cipher key-based security for data associated with the second port using the second selectable path,
wherein the first security engine and the second security engine are configured to provide, in combination, cipher key-based security for data associated with the third port using the third selectable data path.

2. The microchip architecture of claim 1 comprising:
control logic adapted to configure at least the first security engine and the second security engine to provide the cipher key-based security for data associated with the first port and the second port using the first selectable path and the second selectable path, respectively, and to configure at least the first security engine and the second security engine to provide the cipher key-based security of data associated with the third port using the third selectable data path.

3. The microchip architecture of claim 2 wherein the control logic includes register access control logic configured to receive commands from a local management interface to configure at least the first security engine and the second security engine in response thereto.

4. The microchip architecture of claim 1 wherein at least the first security engine and the second security engine are included in a first security architecture configured to provide the cipher key-based security for data associated with the first port and the second port using the first selectable path and the second selectable path, respectively, and comprising:
a second security architecture including at least the first security engine and the second security engine that are configured to provide the cipher key-based security of data associated with the third port using the third selectable data path.

5. The microchip architecture of claim 1 wherein at least the first security engine and the second security engine each include one or more cipher key managers configured to process a cipher key for each of a plurality of frames of data.

6. The microchip architecture of claim 5 wherein each cipher key manager is configured to determine the cipher key from a memory, based on a security tag associated with a frame of data, and to expand the cipher key for use in performing encryption associated with the frame of data.

7. The microchip architecture of claim 5 wherein the first selectable data path and the second selectable data path are connected to a first and second cipher key manager included in the first security engine and the second security engine, respectively, to perform cipher key processing at the first data rate and the second data rate, also respectively.

8. The microchip architecture of claim 5 wherein the third selectable data path at least partially connects the cipher key managers in parallel to process the cipher key at the third data rate.

9. The microchip architecture of claim 1 wherein at least the first security engine and the second security engine each include one or more cryptography managers configured to provide encryption and/or decryption for each of a plurality of frames of data.

10. The microchip architecture of claim 9 wherein the first selectable data path and the second selectable data path are connected to a first and second cryptography manager of the first security engine and the second security engine, respectively, to perform cipher key processing at the first data rate and the second data rate, also respectively.

11. The microchip architecture of claim 9 wherein the third selectable data path connects the cryptography managers to provide the encryption at the third data rate.

12. The microchip architecture of claim 9 wherein the cryptography managers each include:
cipher round logic pipelined together to provide encryption of the frames of data; and
authentication logic connected in parallel to provide authentication of the frames of data.

13. The microchip architecture of claim 1 wherein at least the first and second security engines include MAC Sec security engines.

14. A method comprising:
providing a first security engine configured to provide cipher key-based security to network data exchanged with a first port of a network switch at a first data rate;
providing a second security engine configured to provide cipher key-based security to network data exchanged with a second port of the network switch at a second data rate;
providing a first selectable data path between the first port and the first security engine;
providing a second selectable data path between the second port and the second security engine; and
providing a third selectable data path between a third port of the network switch and both the first security engine and the second security engine, the third port associated with a third data rate that is higher than both the first data rate and the second data rate,
wherein the first security engine and the second security engine are configured to provide, in combination, cipher key-based security for data associated with the third port using the third selectable data path.

15. The method of claim 14 comprising:
providing control logic configured to select between either the first and second selectable data paths or the third data path.

16. A network device comprising:
a plurality of ports associated with a first data rate, each of the plurality of ports being associated with one of a plurality of selectable data paths;
an additional port associated with a second data rate that is higher than the first data rate and with an additional selectable data path;
a plurality of security engines configured to provide cipher key-based security for frames of data processed by the network device, each of the plurality of security engines being associated with one of the plurality of ports associated with the first data rate and with the selectable data path associated with the one of the plurality of ports, and configured to combine with at least one other of the plurality of security engines to provide cipher key-based security for frames received or sent via the additional port and its associated additional selectable data path; and
control logic configured to associate the plurality of security engines with either the additional port and its associated additional selectable data path or at least a subset of the plurality of ports and an associated subset of the plurality of selectable data paths.

17. The network device of claim 16 wherein the security engines include MACSec security engines.

18. The network device of claim 16 wherein the control logic is configured to group the subset of the plurality of ports and the associated subset of the plurality of selectable data paths with at least one of the plurality of security engines to process frames of data at an intermediate data rate that is in between the first data rate and the second data rate.

19. The network device of claim 16 wherein the plurality of security engines share a cipher key manager configured to process a cipher key for each of a plurality of frames of data, and include separate cryptography managers configured to provide encryption and/or decryption for each of the plurality of frames of data.

20. The network device of claim 16 comprising a local management interface configured to communicate with the control logic to associate the plurality of security engines with either the additional port and its associated additional selectable data path or at least the subset of the plurality of ports and the associated subset of the plurality of selectable data paths.

* * * * *

UNITED STATES PATENT AND TRADEMARK OFFICE
CERTIFICATE OF CORRECTION

| | | |
|---|---|---|
| PATENT NO. | : 8,010,801 B2 | Page 1 of 1 |
| APPLICATION NO. | : 11/606492 | |
| DATED | : August 30, 2011 | |
| INVENTOR(S) | : Zheng Qi et al. | |

It is certified that error appears in the above-identified patent and that said Letters Patent is hereby corrected as shown below:

In column 27, line 37, in claim 13, delete "MAC Sec" and insert -- MACSec --, therefor.

Signed and Sealed this
Eighteenth Day of October, 2011

David J. Kappos
*Director of the United States Patent and Trademark Office*